United States Patent
Yeh et al.

(10) Patent No.: US 11,685,861 B2
(45) Date of Patent: Jun. 27, 2023

(54) QUANTUM DOT STRUCTURE WITH EXCELLENT STABILITY AND METHOD FOR MAKING THE SAME

(71) Applicant: National Tsing Hua University, Hsinchu (TW)

(72) Inventors: Chang-Wei Yeh, Taoyuan (TW); Hsueh-Shih Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 21 days.

(21) Appl. No.: 17/382,196

(22) Filed: Jul. 21, 2021

(65) Prior Publication Data

US 2022/0267672 A1 Aug. 25, 2022

(30) Foreign Application Priority Data

Feb. 22, 2021 (TW) .................. 110106052

(51) Int. Cl.
- *C09K 11/88* (2006.01)
- *C09K 11/08* (2006.01)
- *B82Y 40/00* (2011.01)
- *B82Y 20/00* (2011.01)

(52) U.S. Cl.
CPC ........ *C09K 11/883* (2013.01); *C09K 11/0883* (2013.01); *B82Y 20/00* (2013.01); *B82Y 40/00* (2013.01)

(58) Field of Classification Search
CPC .... C09K 11/883; C09K 11/0883; B82Y 20/00
See application file for complete search history.

(56) References Cited

U.S. PATENT DOCUMENTS

| 9,890,329 B2 | 2/2018 | Chen et al. |
| 2020/0024512 A1 | 1/2020 | Min et al. |

FOREIGN PATENT DOCUMENTS

| CN | 104974759 A | | 10/2015 |
| CN | 111592877 | * | 8/2020 |
| CN | 111592877 A | | 8/2020 |
| TW | I568665 B | | 2/2017 |

OTHER PUBLICATIONS

Translation for CN 11159877, Aug. 28, 2020.*
Yu-Ho Won et al., "Highly efficient and stable InP/ZnSe/ZnS quantum dot light-emitting diodes," Nature, vol. 575, 2019, pp. 634-638.

* cited by examiner

*Primary Examiner* — C Melissa Koslow
(74) *Attorney, Agent, or Firm* — Hamre, Schumann, Mueller & Larson, P.C.

(57) ABSTRACT

A quantum dot structure includes a core and an inner shell. The core is a single crystal of a compound M1C1, and has a core surface having a first region and a second region. The first region has a crystal plane that is inactive with oxygen, and the second region has a crystal plane that is easily reactive with oxygen. The inner shell is a single crystal of a compound M2C2, and is formed on the first region of the core surface. A method for making the quantum dot structure is also disclosed.

20 Claims, 23 Drawing Sheets

QUANTUM DOT STRUCTURE WITH EXCELLENT STABILITY AND METHOD FOR MAKING THE SAME

CROSS-REFERENCE TO RELATED APPLICATION

This application claims priority of Taiwanese Invention Patent Application No. 110106052, filed on Feb. 22, 2021, the entire disclosure of which is incorporated herein by reference.

FIELD

The disclosure relates to a quantum dot structure, and more particularly to a quantum dot structure with good stability and a method for making the same.

BACKGROUND

Since groups II-VI semiconductor compounds (e.g., zinc sulfide (ZnS) and cadmium sulfide (CdS)) and group III-V semiconductor compounds (e.g., indium phosphide (InP)) have unique luminescent properties, such compounds are adapted for use in lighting or display devices. Quantum dots made from the aforesaid semiconductor compounds and having a size in a nanometer scale are usually utilized in a multiple-color laser, an optical sensor or a biological imaging device, etc., due to their tunable optical properties. Furthermore, such quantum dots have a great potential to be used in solar cells because of their high optical absorption coefficient and specific emission wavelength. Since the quantum dots made from such semiconductor compounds can be used in various applications, many researchers have endeavored to enhance stability and quantum yield (QY) of such quantum dots.

Referring to FIG. 1, Taiwanese Invention Patent No. I568665B, which is the counterpart of U.S. Pat. No. 9,890,329B2, discloses a conventional quantum dot nanocrystal structure 1. The conventional quantum dot nanocrystal structure 1 includes: a core 11 of a compound M1A1; an inner shell 12 enclosing the core 11 and having a composition containing a compound $M1_xM2_{1-x}A1_yA2_{1-y}$; and a multi-pod-structured outer shell 13 of a compound M1A2 or M2A2. M1 is a metal selected from the group consisting of Zn, Sn, Pb, Cd, In, Ga, Ge, Mn, Co, Fe, Al, Mg, Ca, Sr, Ba, Ni, Ag, Ti, and Cu, and A1 is an element selected from the group consisting of Se, S, Te, P, As, N, I, and O. M2 is different from M1 and is a metal selected from the group consisting of Zn, Sn, Pb, Cd, In, Ga, Ge, Mn, Co, Fe, Al, Mg, Ca, Sr, Ba, Ni, Ag, Ti, and Cu, and A2 is different from A1 and is an element selected from the group consisting of Se, S, Te, P, As, N, I, and O. In $M1_xM2_{1-x}A1_yA2_{1-y}$, $0<x\le1$, $0<y<1$, and y decreases over a layer thickness of the inner shell 12 in a direction from the core 11 toward the inner shell 12. The multi-pod-structured outer shell encloses the inner shell 12, and has a base portion 131 and a plurality of protrusion portions 132 that are spaced apart from one another and that extend from the base portion 131 in a direction away from the inner shell 12. In an example of the conventional quantum dot nanocrystal structure, the core is composed of ZnS, the inner shell 12 is composed of $Zn_xCd_{1-x}Se_yS_{1-y}$, and the multi-pod-structured outer shell 13 is composed of ZnSe or CdSe. Such example of the conventional quantum dot nanocrystal structure may be obtained by heating a Zn—Cd-containing precursor in a three-neck round-bottom flask to a temperature of 260° C., followed by injecting a Se—S-containing precursor into the three-neck round-bottom flask to allow a first stage reaction between the Zn—Cd-containing precursor and the Se—S-containing precursor to occur for 1 minute, and then heating the mixture to 320° C. to allow a second stage reaction to occur for 3 minutes. After that, the mixture is cooled to 160° C., and is kept at this temperature for 1 hour. The mixture is then further cooled, and is repeatedly washed with a mixture of 50 mL toluene and 50 mL ethanol and centrifuged so as to obtain a powder of the quantum dot. In the aforesaid conventional method, the inner shell 12 and the multi-pod-structured outer shell 13 may be concurrently formed by a thermal equilibrium process during crystal growth of the quantum dot nanocrystal structure, thereby increasing the mechanical strength between the multi-pod-structured outer shell 13 and the inner shell 12, and improving the quantum yield (QY) and stability of the quantum dots.

It has been reported that quantum dots are very sensitive to external environment due to their large surface-to-volume ratio. Moreover, surface ligands on the quantum dots are easily detached from surfaces of the quantum dots, which causes oxidation of the quantum dots and a decrease in the QY.

Chinese Invention Patent Application Publication No. 111592877A (CN 111592877 A) discloses a conventional quantum dot with a core-shell structure, and a method for preparing the same. The conventional quantum dot with the core-shell structure includes an InP core, a ZnSe/ZnS shell or a ZnSe shell that wraps the InP core. The conventional quantum dot is made by first subjecting an In-containing precursor and a P-containing precursor in a first mixture to nucleation and growth at 260° C. for 30 minutes so as to form InP cores, afterwards, the first mixture is cooled to room temperature and added with acetone to precipitate the InP cores, followed by centrifugation to collect the InP cores. Next, the InP cores are mixed with N-hexane, oleic acid, and oleylamine to obtain a second mixture, and then the second mixture is degassed at 120° C. for 30 minutes to remove N-hexane and water vapor therefrom. Then, ammonium fluoride ($NH_4F$) and acetone are quickly added into the second mixture at 180° C. to remove oxides formed on surfaces of the InP cores. After 10 minutes, the second mixture is heated to 340° C., and is added with a Zn-containing precursor and a Se-containing precursor, followed by a reaction at this temperature for 70 minutes so as to obtain a quantum dot with an InP/ZnSe core-shell structure. While the oxides formed on the surfaces of the InP cores was removed by $NH_4F$, the InP cores are also etched by $NH_4F$. As a result, it is difficult to control the size of the quantum dots, which leads to difficulty in controlling the emission band of the quantum dots.

Yu-Ho Won et al. (2019), Nature, 575:634-638 discloses a method for making InP/ZnSe/ZnS quantum dots, which is described as follows. First, a first mixture solution containing a precursor of In and a precursor of P is reacted at 260° C. for 40 minutes to synthesize InP cores with a size of about 2.7 nm. Then, a precursor of In and a precursor of P are further added into the first mixture solution so as to obtain InP cores with a size of about 3.3 nm. After that, the first mixture solution is cooled to room temperature, and then acetone is added to precipitate the InP cores, followed by centrifugation to collect the InP cores. The thus collected InP cores are dispersed in toluene, thereby obtaining a second mixture solution. A precursor of Zn is added into the second mixture solution at 180° C., followed by injection of a diluted hydrogen fluoride (HF) solution to obtain a third mixture solution. The HF solution is used to inhibit oxidation on the surfaces of the InP cores. Afterward, the third mixture solution is heated to a temperature ranging from 320° C. to 340° C., and a precursor of Zn and a precursor of Se are sequentially added into the third mixture solution, followed by a reaction for 1 hour so as to grow a ZnSe shell on the InP core. Thereafter, a precursor of Zn and a precursor of S are sequentially added into the third mixture solution at a temperature ranging from 320° C. to 340° C., followed by a reaction at such temperature for 20 minutes so as to grow a ZnS shell on the ZnSe shell, and a solution containing InP/ZnSe/ZnS core-shell-shell quantum dots is thus obtained. Finally, the solution containing InP/ZnSe/ZnS core-shell-shell quantum dots is cooled to room temperature, followed by addition of ethanol and centrifugation at 5800 rpm for 5 minutes in order to precipitate and collect the InP/ZnSe/ZnS core-shell-shell quantum dots. The thus collected InP/ZnSe/ZnS core-shell-shell quantum dots are then dispersed in octane. During the formation of the ZnSe shell and ZnS shell at 320° C., a thickness of the ZnSe/ZnS shell increases (i.e., the ZnSe shell increases about 3.5 nm in thickness, and the ZnS shell increases about 0.3 nm in thickness), and each of the quantum dot nanocrystals has an irregular appearance and the QY thereof decreases from 98% to 75%. In addition, during the process of forming the ZnSe shell and the ZnS shell at 340° C., a thickness of the ZnSe/ZnS shell increases (i.e., the ZnSe shell increases about 3.6 nm in thickness, and the ZnS shell increases about 0.2 nm in thickness), and each of the quantum dot nanocrystals has a spherical appearance and the QY thereof reaches around 100%.

It should be noted that, the diluted HF is added into the reaction system before forming the ZnSe shell and the ZnS shell so as to inhibit surface oxidation of the InP cores. However, the diluted HF releases toxic gases at high temperature. In addition, in the InP/ZnSe/ZnS quantum dots having 100% QY, the InP core has large size of 5.6 nm to 7.0 nm (see FIG. 1a and Extended Data Table 2), indicating that the amount of raw materials used during core nucleation is high, which makes it difficult to reduce material cost.

In view of the aforementioned shortcomings, there is a need for those skilled in the art to provide quantum dots with enhanced stability and a preparation method with high production efficiency.

SUMMARY

Therefore, an object of the present disclosure is to provide a quantum dot structure that can alleviate at least one of the drawbacks of the prior art.

According to a first aspect of the present disclosure, there is provided a quantum dot structure that includes a core, and an inner shell core. The core is a single crystal of a compound M1C1 and has a core surface that has a first region and a second region. The first region has a crystal plane that is inactive with oxygen, the second region has a crystal plane that is easily reactive with oxygen. The inner shell is a single crystal of a compound M2C2, and is formed on the first region of the core surface.

M1 is an element selected from the group consisting of Al, Ga, and In, and C1 is an element selected from the group consisting of P, As, and combinations thereof. M2 is an element selected from the group consisting of Zn, Pb, Ag, Cu, Mn, Cd, and Mg, and C2 is an element selected from the group consisting of S, Se, O, F, Cl, Br, I, Te, and combinations thereof.

According to a second aspect of the disclosure, there is provided a method for making a quantum dot structure. The method includes the steps of:

a) mixing a solution containing a precursor of M1 with a solution containing a precursor of C1, and reacting the precursor of M1 with the precursor of C1 to obtain a first mixture solution containing a core that is a single crystal of a compound M1C1, the core having a core surface that has a first region and a second region, the first region being inactive with oxygen, the second region being oxidized by oxygen present in the first mixture solution to form an oxide layer thereon;

b) adding a solution containing a precursor of M2 and a solution containing a precursor of C2 into the first mixture solution and growing a compound M2C2 on the first region of the core surface so as to obtain a second mixture solution containing a first quantum dot that has the core and an inner shell of the compound M2C2 formed on the first region of the core;

c) adding dropwise an etchant into the second mixture solution to selectively etch the oxide layer formed on the second region;

d) diluting the etchant in the second mixture solution to terminate etching of the oxide layer;

e) filtering the second mixture solution to obtain the first quantum dot that has the core and the inner shell formed on the core;

f) adding the first quantum dot obtained in step e) into a dispersant-containing solution to obtain a third mixture solution;

g) settling the third mixture solution;

h) after step g), filtering the third mixture solution to remove residue of the etchant from the first quantum dot so as to obtain a fourth mixture solution containing the first quantum dot; and i) mixing the fourth mixture solution with a solution containing a precursor of M2 and a solution containing a precursor of C2, and growing an outer shell of a single crystal of a compound M2C2 on the second region of the core surface and the inner shell, the outer shell including a first portion and a second portion, the first portion being grown on the inner shell, the second portion being grown on the second region of the core surface and being connected to the first portion, wherein M1 is an element selected from the group consisting of Al, Ga, and In, and C1 is an element selected from the group consisting of P, As, and combinations thereof, and M2 is an element selected from the group consisting of Zn, Pb, Ag, Cu, Mn, Cd, and Mg, and C2 is an element selected from the group consisting of S, Se, O, F, Cl, Br, I, Te, and combinations thereof.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
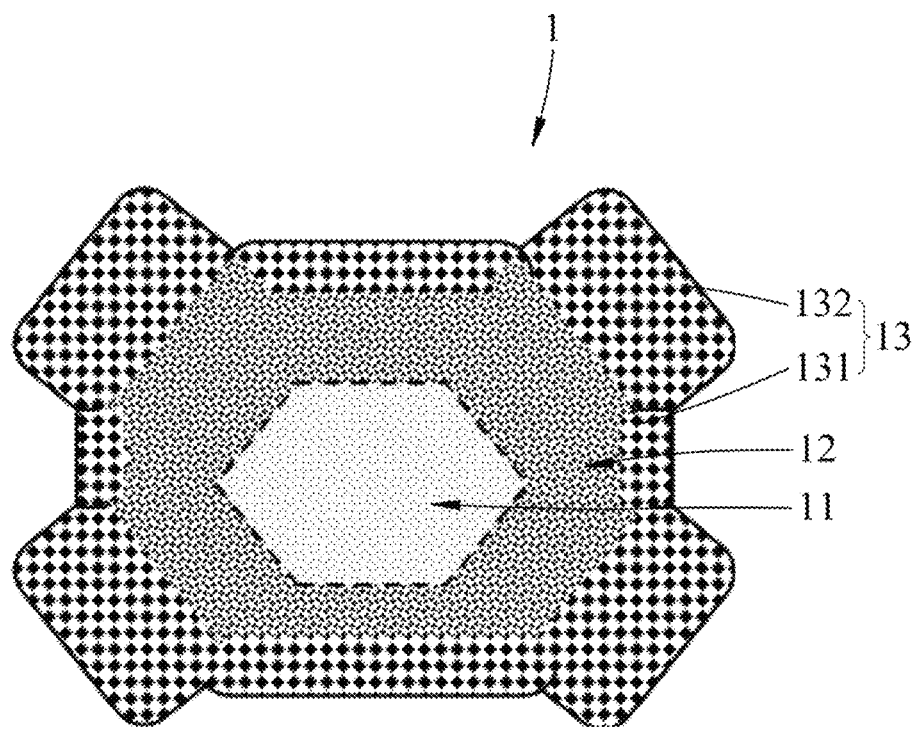
FIG. 1 is schematic view illustrating a conventional quantum dot nanocrystal structure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
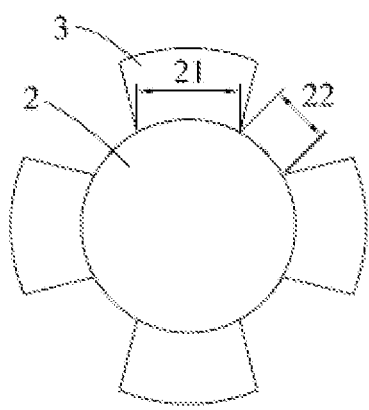
FIG. 2 is a schematic view illustrating a first embodiment of a quantum dot structure according to the present disclosure.

FIG. 2 illustrates a first embodiment of a quantum dot structure according to the present disclosure. The quantum dot structure includes a core 2 of a compound M1C1, and an inner shell 3 of compound M2C2 that is formed on the core 2. The core 2 is a single crystal that has a core surface. The core surface has a first region 21 and a second region 22. The first region 21 is a crystal plane that is inactive with oxygen, and the second region 22 is a crystal plane that is easily reactive with oxygen. The inner shell 3 is a single crystal that forms on the first region 21 of the core surface. M1 is an element selected from at least one of the group consisting of Al, Ga, and In. C1 is an element selected from at least one of the group consisting of P and As. M2 is an element selected from at least one of the group consisting of Zn, Pb, Ag, Cu, Mn, Cd, and Mg. C2 is an element selected from at least one of the group consisting of S, Se, O, F, Cl, Br, I, and Te.

In some embodiments, the inner shell 3 has a thickness ranging from 1 Å to 10 Å.

In certain embodiments, the compound M1C1 of the core 2 is InP, and the compound M2C2 of the inner shell 3 is ZnSe. The first region 21 has a crystal plane of {111}.

Figure 3:
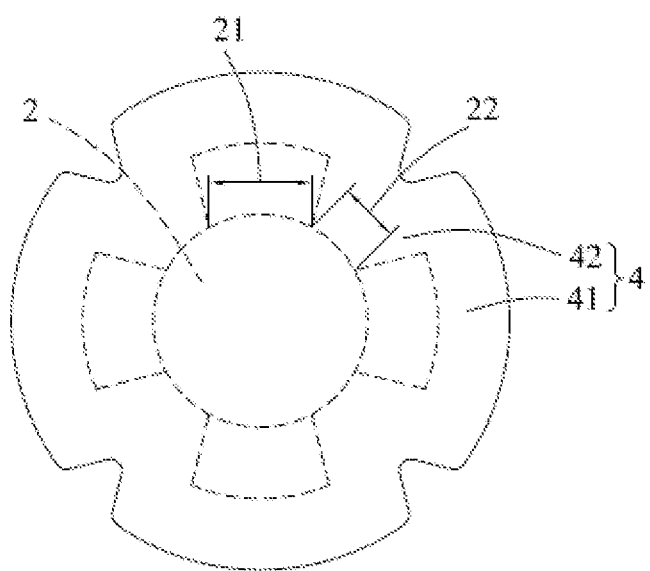
FIG. 3 is a schematic view illustrating a second embodiment of a quantum dot structure according to the present disclosure.

FIG. 3 illustrates a second embodiment of a quantum dot structure according to the present disclosure. The quantum dot structure of the second embodiment is similar to that of the first embodiment except that the quantum dot structure of the second embodiment further includes an outer shell 4 that is a single crystal of a compound M2C2. The outer shell 4 includes a first portion 41 that is formed on the inner shell 3, and a second portion 42 that is formed on the second region 22 of the core surface, and that is integrally connected to the first portion 41 of the outer shell 4.

In some embodiments, the compound M2C2 of the outer shell 4 is different from the compound of M2C2 of the inner shell 3. In some embodiments, the compound M2C2 of the outer shell 4 is the same as the compound of M2C2 of the inner shell 3.

In certain embodiments, each of the compound M2C2 of the outer shell 4 and the compound M2C2 of the inner shell 3 is one of ZnSe, ZnSeS, ZnS, and combinations thereof.

In some embodiments, the quantum dot structure may have the core 2 of InP, the inner shell 3 of ZnSe, and the outer shell 4 of ZnSe. In some embodiments, the quantum dot structure may have the core 2 of InP, the inner shell 3 of ZnSe, and the outer shell 4 of ZnSeS. In some embodiments, the quantum dot structure may have the core 2 of InP, the inner shell 3 of ZnSe, and the outer shell 4 of ZnSe/ZnS. The quantum dot structure of the present disclosure has a QY greater than 80%.

In some embodiments, the first region 21 has a crystal plane of {111}, and the second crystal region 22 has at least one of the crystal planes of {311}, {220}, and {200}.

A method for making the quantum dot structure of the present disclosure includes the following steps:

a) mixing a solution containing a precursor of M1 with a solution containing a precursor of C1, and reacting the precursor of M1 with the precursor of C1 to obtain a first mixture solution containing a core 2 that is a single crystal of a compound M1C1, the core 2 having a core surface that has a first region 21 and a second region 22, the first region 21 being inactive with oxygen, the second region 22 being oxidized by oxygen present in the first mixture solution to form an oxide layer thereon;

b) adding a solution containing a precursor of M2 and a solution containing a precursor of C2 into the first mixture solution and growing a compound M2C2 on the first region of the core surface so as to obtain a second mixture solution containing a first quantum dot that has the core 2 and an inner shell 3 of the compound M2C2 formed on the first region 21 of the core 2;

c) adding dropwise an etchant into the second mixture solution to selectively etch the oxide layer formed on the second region 22;

d) diluting the etchant in the second mixture solution to terminate etching of the oxide layer;

e) filtering the second mixture solution to obtain the first quantum dot that has the core 2 and the inner shell 3 formed on the core 2;

f) adding the first quantum dot obtained in step e) into a dispersant-containing solution to obtain a third mixture solution;

g) settling the third mixture solution; and h) after step g), filtering the third mixture solution to remove residue of the etchant from the first quantum dot so as to obtain a fourth mixture solution containing the first quantum dot.

M1 is an element selected from at least one of the group consisting of Al, Ga, and In. C1 is an element selected from at least one of the group consisting of P and As. M2 is an element selected from at least one of the group consisting of Zn, Pb, Ag, Cu, Mn, Cd, and Mg. C2 is an element selected from at least one of the group consisting of S, Se, O, F, Cl, Br, I, and Te.

In some embodiments, the inner shell 3 has a thickness ranging from 1 Å to 10 Å.

In certain embodiments, the method further includes, after step h), step i) mixing the fourth mixture solution with a solution containing a precursor of M2 and a solution containing a precursor of C2, and growing an outer shell of a single crystal of a compound M2C2 on the second region of the core surface and the inner shell 3. The outer shell 4 includes a first portion 41 grown on the inner shell 3, and a second portion 42 grown on the second region 22 of the core surface and being integrally connected to the first portion 41.

In some embodiments, the compound M2C2 of the outer shell 4 is different from the compound of M2C2 of the inner shell 3. In certain embodiments, the compound M2C2 of the inner shell 3 is ZnSe. In certain embodiments, the compound M1C1 of the core 2 is InP. In certain embodiments, the compound M2C2 of the outer shell 4 is one of ZnSe, ZnSeS, ZnS, and combinations thereof.

In certain embodiments, the first region 21 has a crystal plane of {111}, and the second region 22 has at least one of crystal planes of {311}, {220}, and {200}.

In some embodiments, the etchant is a fluoride-containing etchant. In some embodiments, the etchant may be a $NH_4F$ solution diluted with methanol.

It is noted that, the etchant can selectively etch the oxide layer because the etch rate of the oxide layer is far higher than the etch rate of the inner shell 3 of the compound M2C2. The inner shell 3 may be etched by the etchant, however, the etch rate of the inner shell 3 is relatively low compared to that of the oxide layer. Therefore, the inner shell 3 can provide protection against the etchant on the surface of the core 2 of the compound M1C1 where the inner shell 3 is formed, so that the particle size distribution of the M1C1/M2C2 core-shell quantum dots can be stably controlled.

However, overetching may occur when too much etchant is used, which adversely affects the particle size distribution of the M1C1/M2C2 core-shell quantum dots.

In certain embodiments, in step c), a molar ratio of the etchant to the second mixture solution ranges between 700:1 and 2000:1.

It is noted that, in step g), the M1C1/M2C2 core-shell quantum dots undergo a ligand-exchange procedure with the dispersant. The amount of the dispersant in the dispersant-containing solution determines the yield of the product made by the method for making the quantum dot structure (i.e., amount of the quantum dots obtained after step h)) of the present disclosure. To be more specific, residue of the etchant (e.g., organic salt) on the core-shell quantum dot adversely affects subsequent shell growth procedures, which decreases the product yield. Thus, the product yield would be decreased when the amount of the dispersant is insufficient.

In certain embodiments, in step f), a molar ratio of the dispersant to the first quantum dot ranges between 50:1 and 2000:1. In certain embodiments, the dispersant-containing solution is a mixture solution containing octylamine (OCA) and octadecene (ODE).

Further, in examples disclosed hereinafter, due to the high cost of OCA, the molar ratio of the dispersant to the first quantum dot is about 500:1, which results in a yield of about 60% of the first quantum dot in step (h). The relationship between the molar ratio of the dispersant to the first quantum dot and the yield of the first quantum dot in step (h) is disclosed as follows. When the molar ratio of the dispersant to the first quantum dot is 50:1, the yield of the first quantum dot is about 10%. When the molar ratio of the dispersant to the first quantum dot is 2000:1, the yield of the first quantum dot is about 80%.

The disclosure will be further described by way of the following examples. However, it should be understood that the following examples are solely intended for the purpose of illustration and should not be construed as limiting the disclosure in practice.

EXAMPLES

General Experimental Materials
1. Toluene ($C_7H_8$, purity: >99%), acetone (($CH_3)_2CO$, purity: >99%), and methanol ($CH_3OH$, purity: >99%) were purchased from Echo Chemical Co., Ltd.
2. Zinc acetate ($Zn(OAc)_2$, purity: 99.99%), selenium (Se) powder (purity: 99.99%), oleic acid (OA, purity: 90%), octadecene (ODE, purity: 90%), hexane (concentration: 99.6%, ACS reagent), ethanol ($C_2H_5OH$, purity: 99.5%), and hydrofluoric acid (HF, concentration: 48%, ACS reagent) were purchased from Sigma-Aldrich.
3. Indium acetate ($In(OAc)_3$, purity: 99.99%), sulfur powder (S, purity: 99.5%), trioctylphosphine (TOP, purity: 90%), octylamine (OCA, purity: 99%), and ammonium fluoride ($NH_4F$, purity: 98%) were purchased from Alfa Aesar.
4. Tris(trimethylsilyl)phosphine (($TMS)_3P$, purity: 98%) was purchased from DALCHEM, Russia.

Preparation of a Precursor of Se and a Precursor of S

Selenium powders were dissolved in TOP, followed by stirring at 60° C. for 1 hour in an inert gas atmosphere, and then cooled to room temperature (about 25° C.), so as to form a precursor of Se, i.e., trioctylphosphine selenide (TOPSe).

Sulfur powders were dissolved in TOP, followed by stirring at 60° C. for 1 hour in an inert gas atmosphere, and then cooled to room temperature (about 25° C.), so as to form a precursor of S, i.e., trioctylphosphine sulfide (TOPS).

Preparation of Quantum Dots

Comparative Example 1 (CE1)

First, a mixture of $In(OAc)_3$ (1.5 mmol), ODE (7.3 mL), and OA (4.5 mmol) was added into a first three-neck round-bottom flask (flask volume: 50 mL). The mixture was evacuated at 110° C. for 12 hours, followed by filling the first three-neck round-bottom flask with nitrogen gas to obtain a solution containing a precursor of In. Then, 1.0 mL of $(TMS)_3P$/TOP with a concentration of 1 M was quickly added into the first three-neck round-bottom flask, and was mixed with the solution containing the precursor of In, followed by heating to 300° C. and a reaction at 300° C. for 2 minutes so as to form a first mixture solution containing single crystal InP cores. The first three-neck round-bottom flask was then cooled to 50° C., followed by filtration of the first mixture solution using a polytetrafluoroethylene (PTFE) filter with a pore size of 0.22 μm. The filtered first mixture solution containing InP cores was then stored in a glove box.

A mixture of $Zn(OAc)_2$ (2.2 mmol), ODE (8.9 mL), and OA (4.4 mmol) was added into a second three-neck round-bottom flask (flask volume: 50 mL). The mixture was evacuated at 110° C. for 1 hour, followed by filling the second three-neck round-bottom flask with nitrogen gas to obtain a solution containing a precursor of Zn. Then, 8 mL of the filtered first mixture solution and 0.17 mL of the solution containing the precursor of Se were simultaneously injected into the solution containing the precursor of Zn to obtain an InP/Se precursor/Zn precursor mixture. The InP/Se precursor/Zn precursor mixture was evacuated at 150° C. for 10 minutes, followed by heating the InP/Se precursor/Zn precursor mixture to 300° C. After that, 2.06 mL of TOPSe was injected into the InP/Se precursor/Zn precursor mixture at 300° C. to form a second mixture solution, followed by a reaction at 300° C. for 6 minutes so that the precursor of Zn and the precursor of Se form a shell of ZnSe that is grown on the InP core, thereby obtaining InP/ZnSe core-shell quantum dots of CE1 in the second mixture solution. The second mixture solution was then cooled to room temperature, and was mixed with an excess amount of methanol, followed by centrifugation at 5000 rpm for 1 minute twice so as to collect the InP/ZnSe core-shell quantum dots of CE1. The InP/ZnSe core-shell quantum dots of CE1 were then dispersed in toluene, and stored in a glove box.

Figure 4:
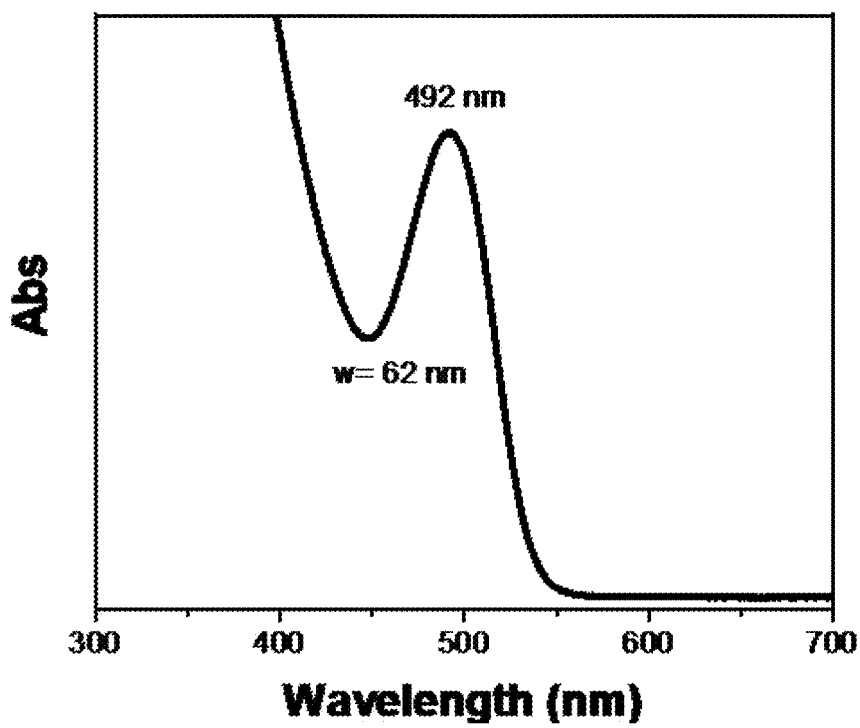
FIG. 4 is an ultraviolet-visible light (UV-Vis) absorption spectrum illustrating an absorption peak of InP cores of Comparative Example 1 (CE1)
Figure 5:
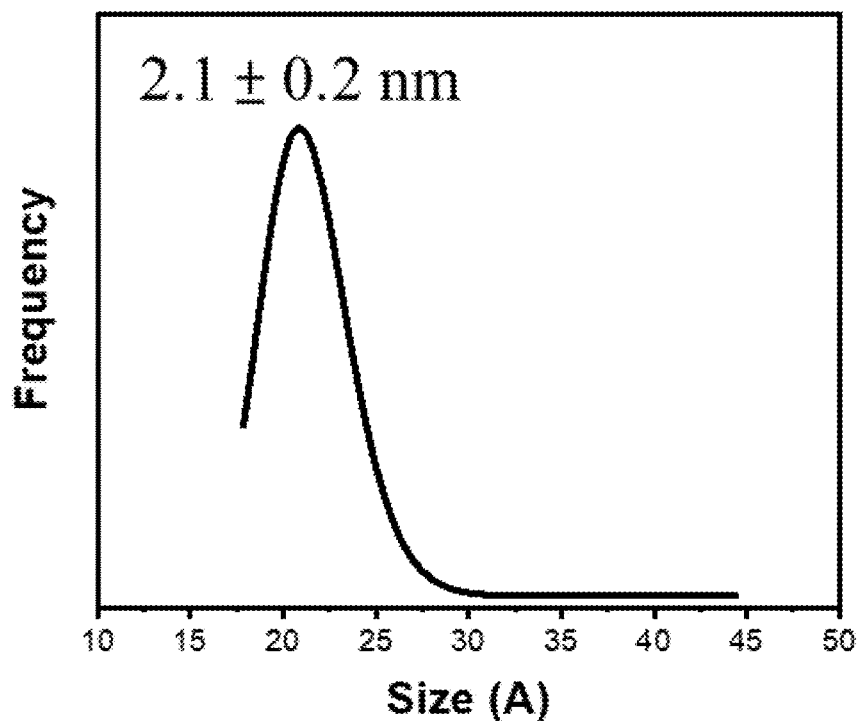
FIG. 5 is a curve illustrating particle size distribution of InP cores of CE1.
Figure 6:
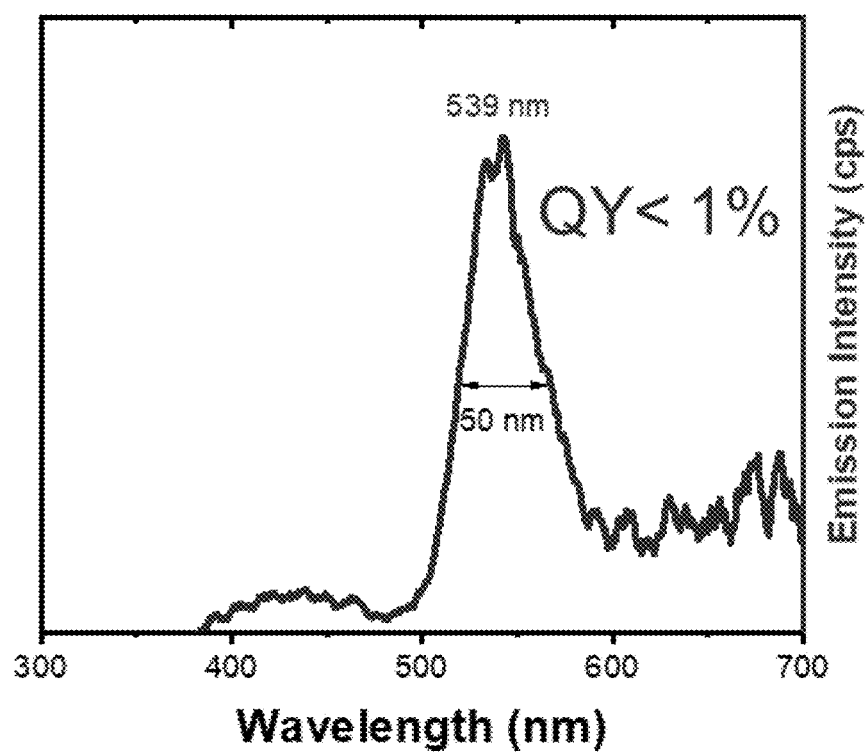
FIG. 6 is a photoluminescence (PL) spectrum illustrating an emission peak value and quantum yield (QY) of the InP cores of CE1.

Referring to FIG. 4, the ultraviolet-visible light (UV-Vis) absorption spectrum of CE1 shows that the InP core of CE1 has an absorption peak of 492 nm and a full width at half maximum (FWHM) of 62 nm. It is noted that the particle size distribution of the quantum dots may be obtained based on the UV-vis absorption spectrum and an FWHM value from a photoluminescence (PL) spectrum. In addition, the greater the FWHM value, the broader the particle size distribution. The particle size of the quantum dots of CE1 can be calculated from FIG. 4, and is shown in FIG. 5 (please note that the InP cores of CE1 have a particle size of substantially 2.1±0.2 nm). According to the PL spectrum of FIG. 6, the InP core of CE1 has an emission wavelength of 539 nm and a FWHM value of 50 nm after being radiated by UV light. In addition, since a portion of the crystal planes on the surface of the InP core of CE1 is easily reactive with oxygen in the first mixture solution, an oxide layer can be found on the InP core of CE1, thereby resulting in a quantum yield (QY) of the InP core of CE1 being lower than 1%.

Figure 7:
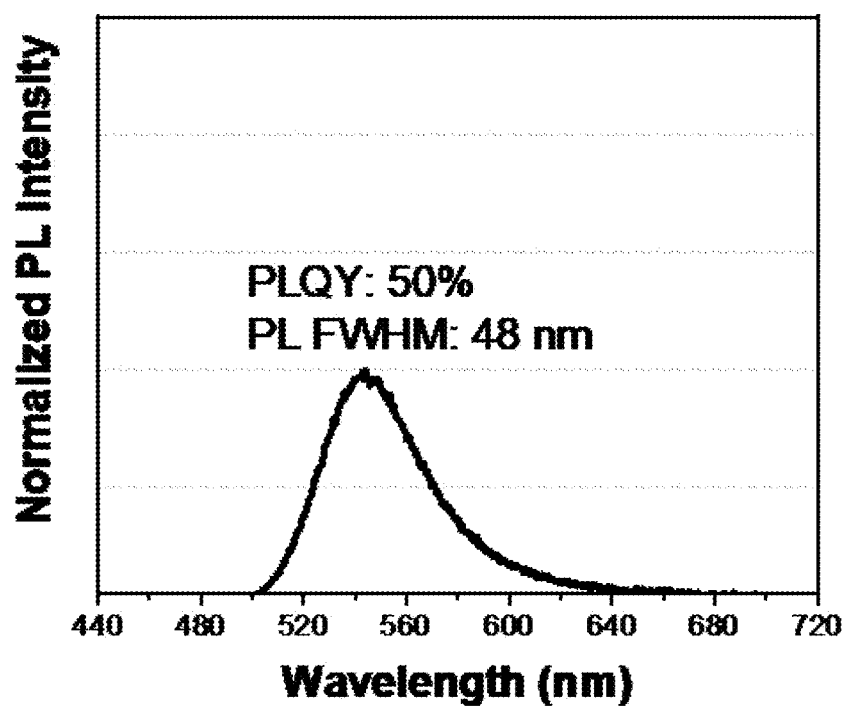
FIG. 7 is a PL spectrum illustrating the full width at half maximum (FWHM) value and QY of the InP/ZnSe core-shell quantum dots of CE1.
Figure 8:
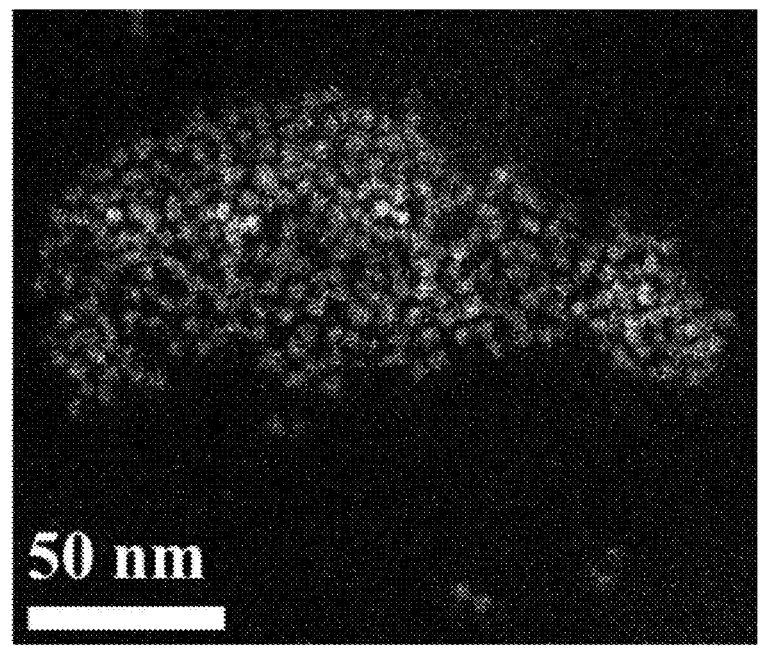
FIG. 8 is a scanning transmission electron microscope (STEM) image illustrating the particle size distribution of the InP/ZnSe core-shell quantum dots of CE1.
Figure 9:
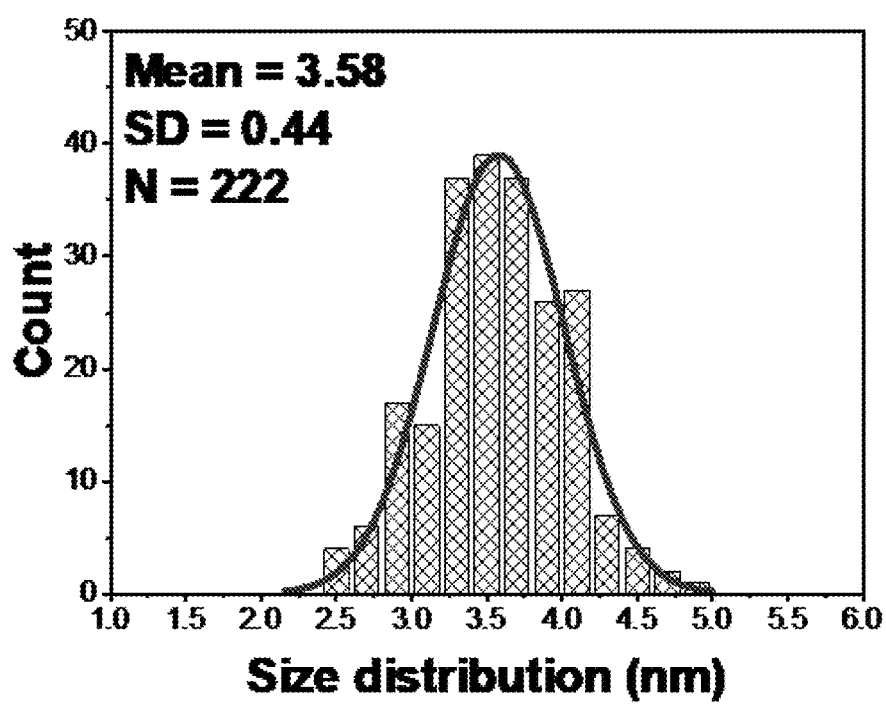
FIG. 9 is a histogram illustrating particle size distribution of the InP/ZnSe core-shell quantum dots of CE1, which is obtained by calculating the data of FIG. 8.

Referring to FIG. 7, the PL spectrum showed that the InP/ZnSe core-shell quantum dots of CE1 has an emission wavelength of 544 nm and a FWHM value of 48 nm, and that the InP/ZnSe core-shell quantum dot of CE1, compared to the InP core of CE1, has an improved QY of 50%. Nevertheless, the application of the quantum dots is still limited. In addition, referring to FIG. 8, the STEM image shows that the InP/ZnSe core-shell quantum dots of CE1 have a particle size of about 3 nm to 4 nm. As shown by the histogram in FIG. 9, the average particle size of the InP/ZnSe core-shell quantum dots of CE1 (with a sample size of 222) is 3.58 nm, with a standard deviation (SD) of 0.44 nm.

Figure 10:
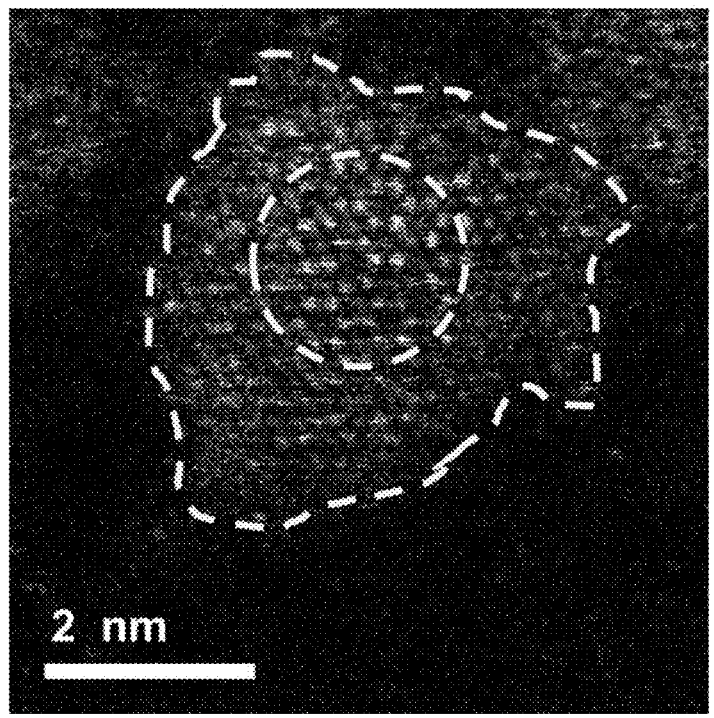
FIG. 10 is a high-resolution scanning transmission electron microscope (HRSTEM) image illustrating the microscopic structure of the InP/ZnSe core-shell quantum dots of CE1.
Figure 11:
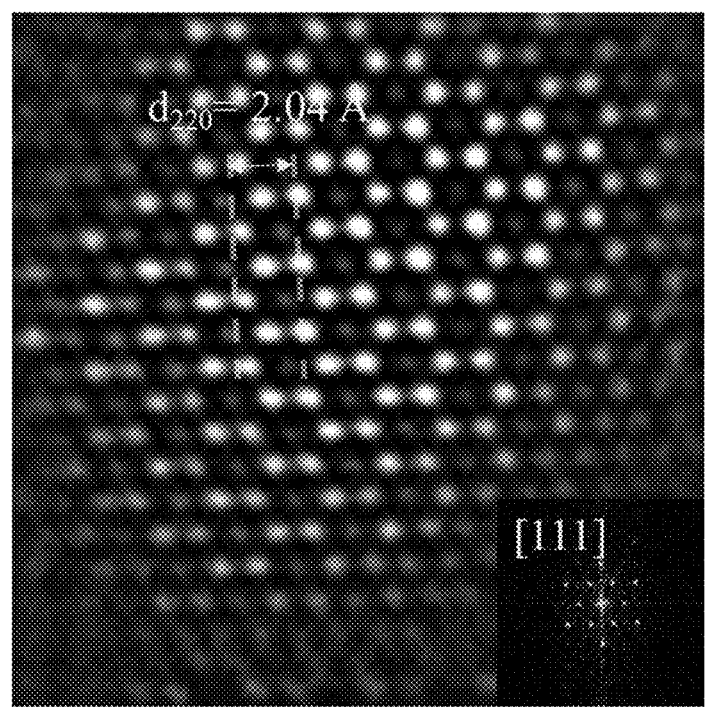
FIG. 11 is a selected area electron diffraction (SAED) image and an inverse fast Fourier transform (IFFT) image illustrating the crystal structure of the InP/ZnSe core-shell quantum dots of CE1.

Referring to FIG. 10, the high-resolution scanning transmission electron microscopy (HRSTEM) image shows that the InP core of CE1 has a size of about 2 nm, and the InP/ZnSe core-shell quantum dot of CE1 has a size of about 4 nm. As shown by the selected area electron diffraction (SAED) pattern inserted in right-bottom part of FIG. 11, the InP/ZnSe core-shell quantum dots of CE1 are face-centered cubic (fcc) single crystals with [111] zone axis. In addition, referring to FIG. 11, the inverse fast Fourier transform (IFFT) image shows that the InP/ZnSe core-shell quantum dot of CE1 has a lattice point spacing on the (220) plane of about 2.04 Å.

Comparative Example 2 (CE2)

InP/ZnSe core-shell quantum dots of CE2 were prepared using procedures similar to those of CE1, except that in CE2, before growing the ZnSe shell, an etchant was injected into the filtered first mixture solution containing the InP cores.

To be specific, hydrogen fluoride (HF) was diluted with methanol to a concentration of 0.5 M, followed by stirring in a fuming hood for 15 minutes so as to obtain the etchant. Then, 15 mL of the etchant was added dropwise into the filtered first mixture solution (volume: about 9 mL) containing the $3 \times 10^{-6}$ moles of InP cores to etch an oxide layer that was formed on the InP cores. The etching procedure was conducted for 15 minutes. A molar ratio of the etchant to the InP cores in the filtered first mixture solution is 1400:1. Then, 72 mL of acetone was quickly added to the filtered first mixture solution to terminate etching of the oxide layer, and thus, the InP cores of CE2 were precipitated, followed by centrifugation at 5000 rpm for 1 minute. The InP cores of CE2 were then collected and subjected to the subsequent procedures as described in CE1.

Figure 12:
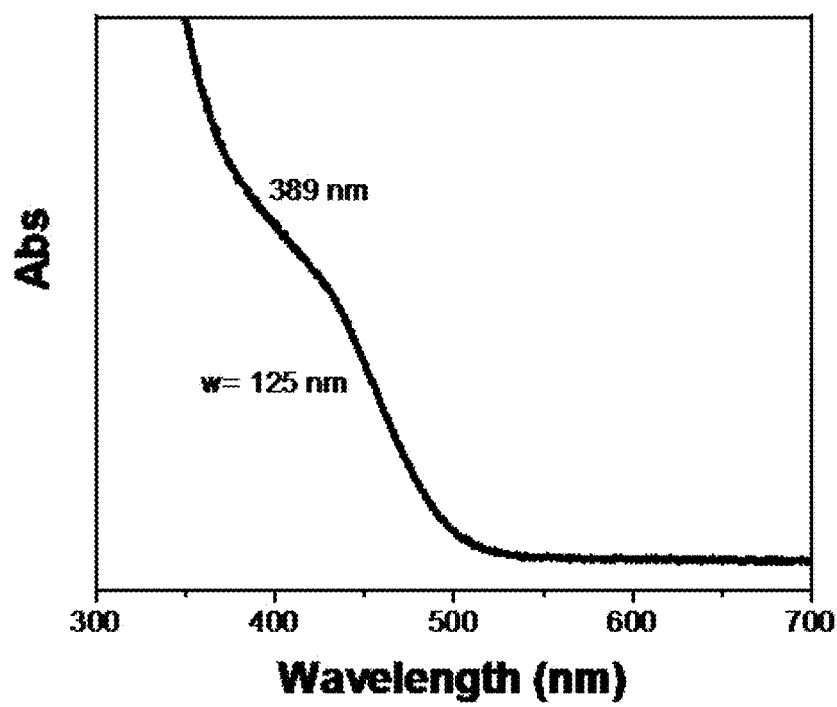
FIG. 12 is a UV-Vis absorption spectrum illustrating an absorption peak value of InP cores of CE2.
Figure 13:
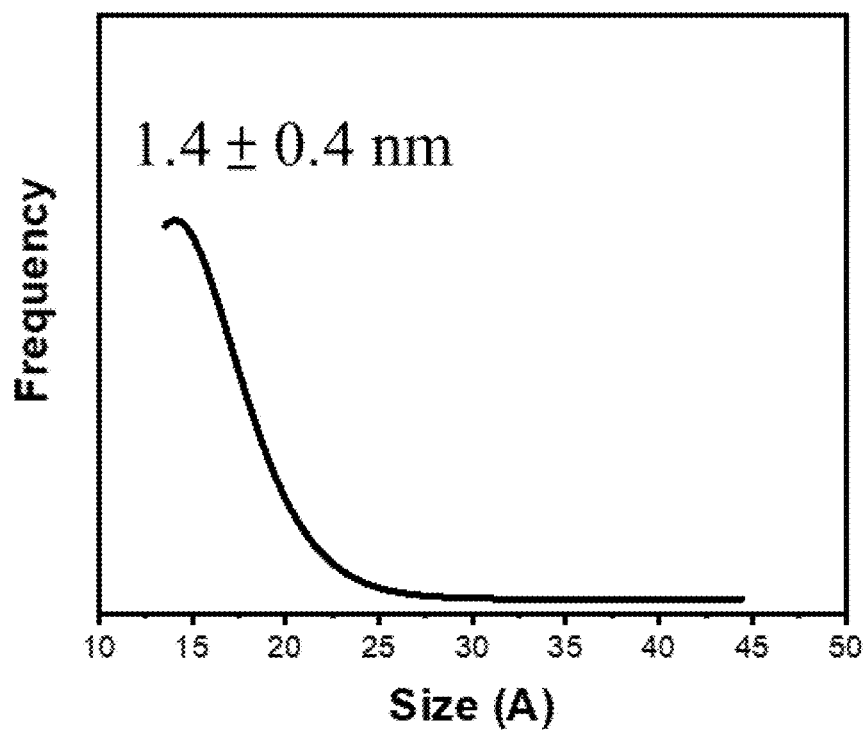
FIG. 13 is a curve illustrating particle size distribution of the InP cores of CE2.
Figure 14:
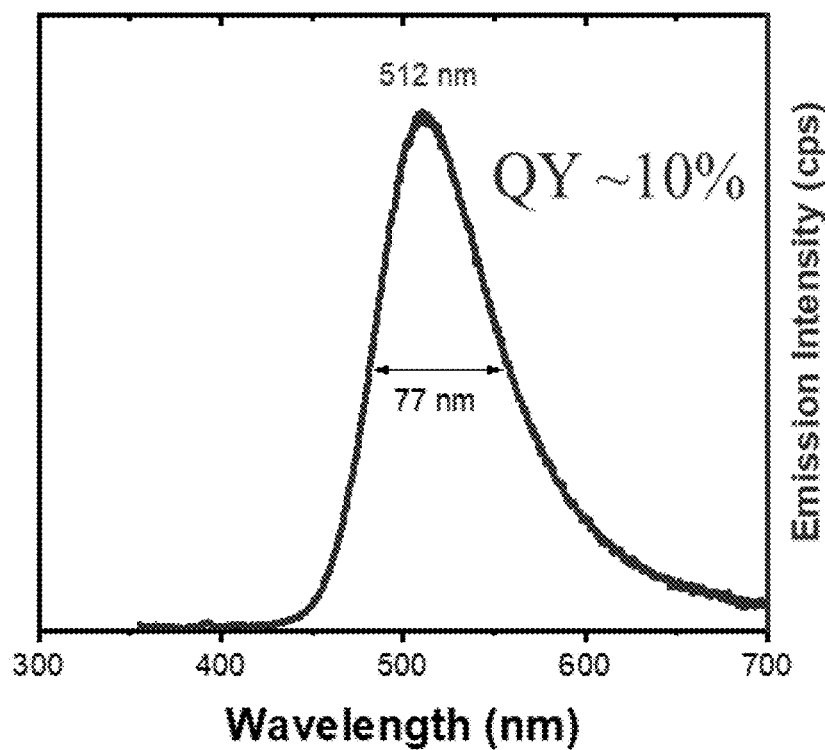
FIG. 14 is a PL spectrum illustrating an emission peak value and QY of the InP cores of CE2.

Referring to FIG. 12, the UV-Vis absorption spectrum of CE2 shows that, compared to InP cores of CE1, the etched InP core of CE2 has a decreased absorption peak of 389 nm and an increased FWHM value of 125 nm. The results suggest that, because of the HF etchant, the etched InP cores of CE2 have a broader particle size distribution as compared to the InP cores of CE1. The particle size of the etched InP cores of CE2 can be calculated based on the data of FIG. 12, and as shown in FIG. 13, the etched InP cores of CE2 have a particle size of about 1.4±0.4 nm, which is smaller than that of the InP cores of CE1. Referring to FIG. 14, the PL spectrum shows that the etched InP core of CE2, after being radiated by UV light, has an emission wavelength of 512 nm, and a FWHM value of 77 nm which is higher than the FWHM of the InP core of CE1. The increased FWHM value indicates that the particle size distribution of the InP core of CE2 is larger than that of CE1, suggesting that the etching procedure is disadvantageous for obtaining InP core with uniform size. The InP core of CE2 have a QY of 10% which is higher than the QY of CE1.

Figure 15:
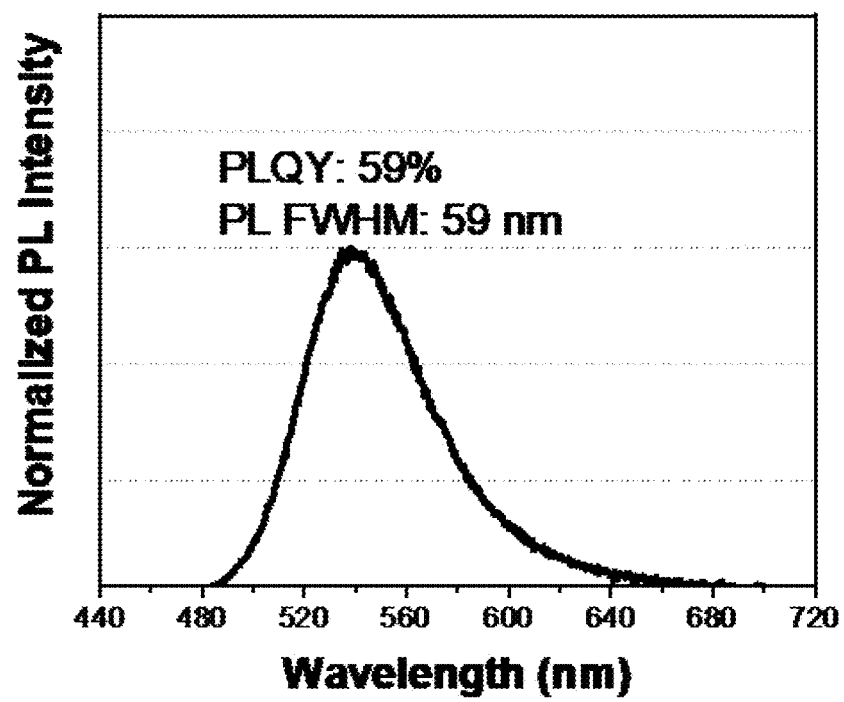
FIG. 15 is a PL spectrum illustrating the FWHM value and QY of the InP/ZnSe core-shell quantum dots of CE2.

Referring to FIG. 15, the InP/ZnSe core-shell quantum dot of CE2 has an emission wavelength of 539 nm and a FWHM value of 59 nm which is larger than the FWHM value of CE1 (48 nm). The InP/ZnSe core-shell quantum dot of CE2 has an improved QY of 59% which is higher than that of CE1 (QY: 50%). Nevertheless, even with the improved QY of 59%, the application of the InP/ZnSe core-shell quantum dots of CE2 is still limited.

Figure 16:
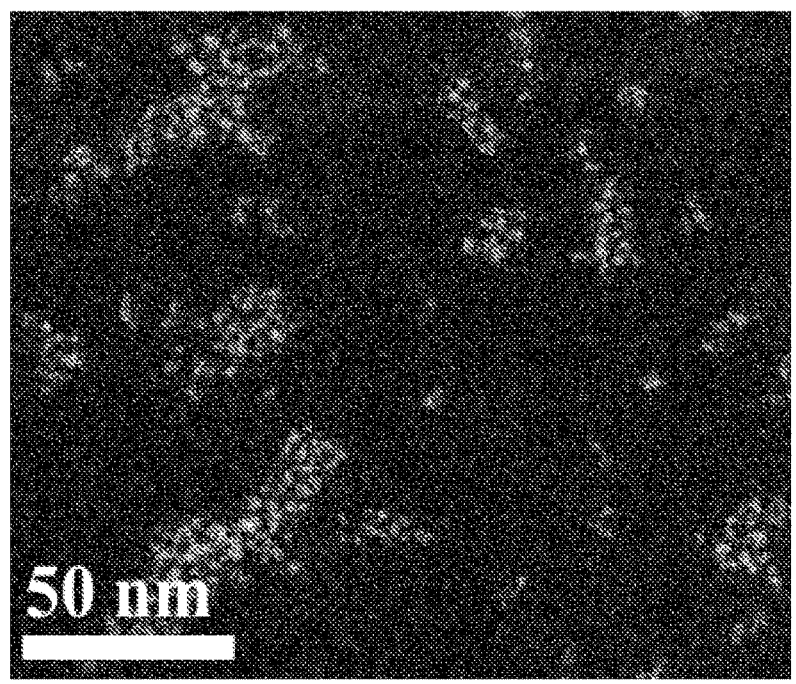
FIG. 16 is a STEM image illustrating particle size distribution of the InP/ZnSe core-shell quantum dots of CE2.
Figure 17:
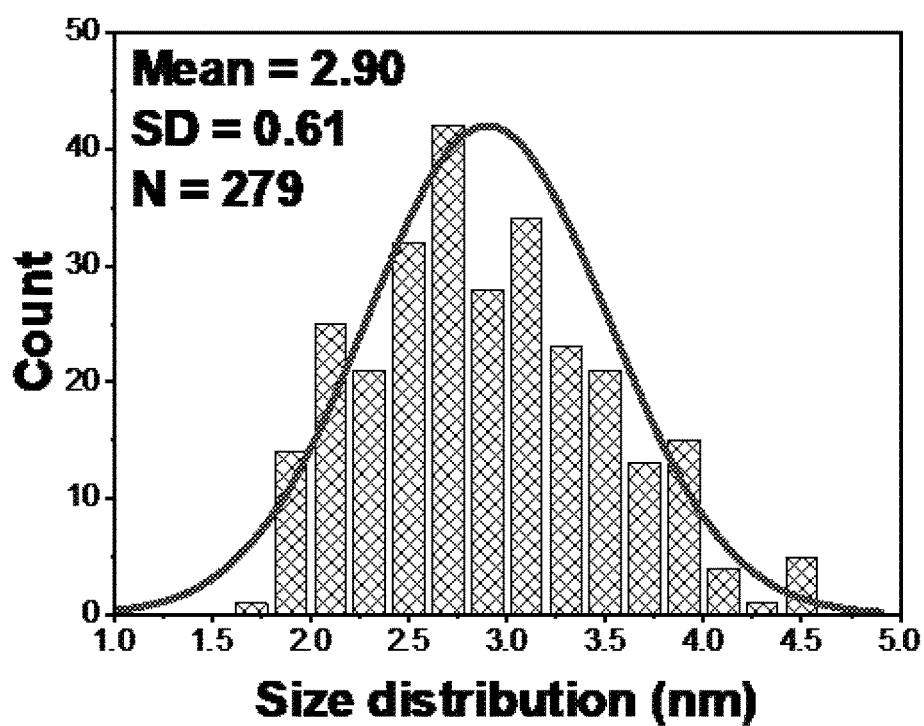
FIG. 17 is a histogram illustrating particle size distribution of the InP/ZnSe core-shell quantum dots of CE2, which is obtained by calculating the data of FIG. 16.

In addition, referring to the STEM images of FIG. 16, the InP/ZnSe core-shell quantum dots of CE2 have a particle size of about 2 nm to 3 nm, and from the histogram shown in FIG. 17, the average particle size of the InP/ZnSe core-shell quantum dots of CE2 (with a sample size of 279) is 2.90 nm, with a SD of 0.61 nm.

Figure 18:
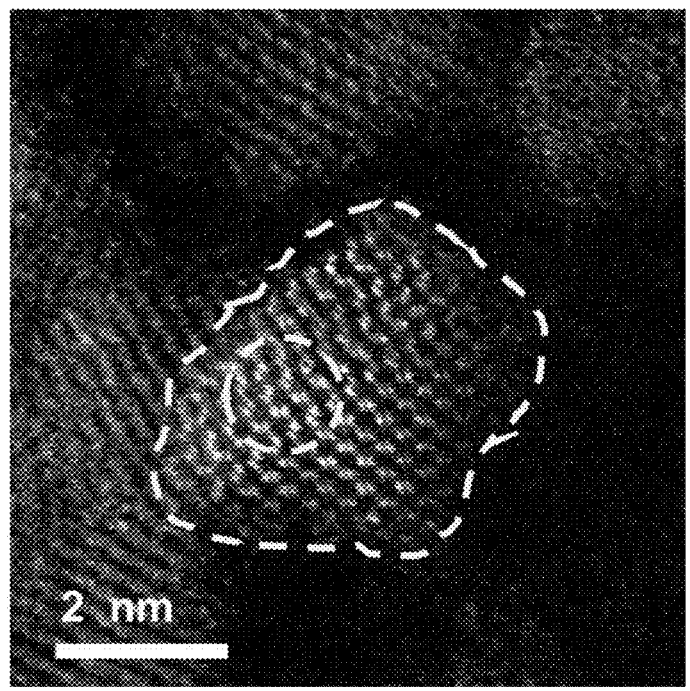
FIG. 18 is a HRSTEM image illustrating the microscopic structure of the InP/ZnSe core-shell quantum dots of CE2.
Figure 19:
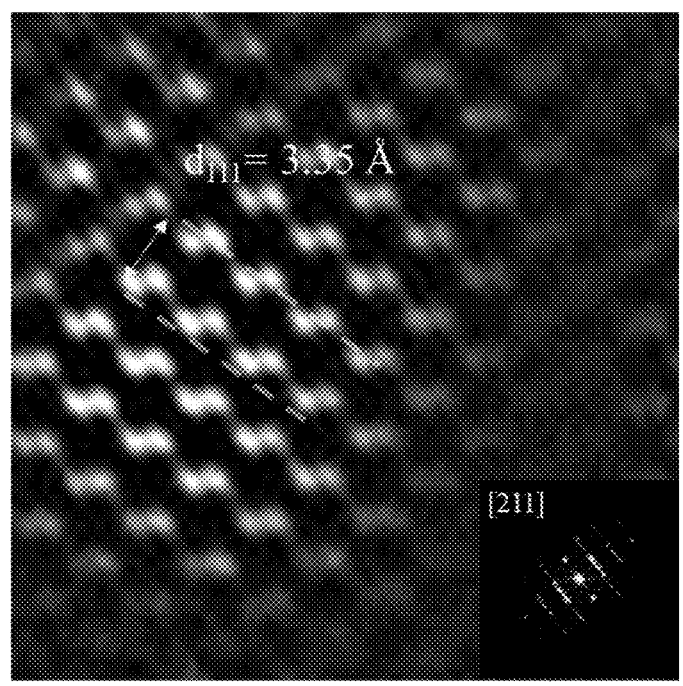
FIG. 19 is a SAED image and an inverse fast Fourier transform IFFT image illustrating the crystal structure of the InP/ZnSe core-shell quantum dots of CE2.

Referring to FIG. 18, the HRSTEM image shows that the etched InP core of CE2 has a particle size of about 1.5 nm, and the InP/ZnSe core-shell quantum dot of CE2 has a particle size of about 4 nm. Referring to the selected area electron diffraction (SAED) pattern inserted in right-bottom part of FIG. 19, it is shown that, with the [211] zone axis, the InP/ZnSe core-shell quantum dots of CE2 are face-centered cubic (fcc) single crystals. In addition, referring to FIG. 19, the IFFT image shows that InP/ZnSe core-shell quantum dot of CE2 has a lattice point spacing on the (111) plane of about 3.35 Å.

Comparative Example 3 (CE3)

The InP/ZnSe core-shell quantum dots of CE3 were prepared using procedures similar to those of CE2, except that in CE3, the etchant was 0.5 M $NH_4F$ instead of HF, and a ligand-exchange procedure was conducted for removing residue of the $NH_4F$ etchant. The ligand-exchange procedure of CE3 is disclosed hereinafter.

First, 1.6 mL of OCA and 10 mL of ODE were mixed to form a dispersant of CE3. InP cores of CE3 collected after the filtration procedure were taken out of the glove box and were dispersed in the dispersant of CE3, followed by heating to 180° C. and stirring at 180° C. for 1 hour, so as to obtain a third mixture solution in a turbid state. The turbid third mixture solution was cooled to room temperature for day to allow the dispersant of CE3 to remove residue of the $NH_4F$ etchant from the InP cores of CE3 through ligand exchange. Residue of the $NH_4F$ etchant removed from the InP cores was remained on the bottom so that the third mixture solution had an upper layer and a bottom layer formed after settling for 1 day. Next, the third mixture solution was centrifuged at 5000 rpm for 1 minute, followed by filtration the bottom layer containing the $NH_4F$ etchant was removed therefrom and a fourth mixture solution containing OCA, ODE, and the InP cores of CE3 was obtained. The fourth mixture solution was then stored in the glove box, and is further subjected to a ZnSe shell growth procedure according to the procedures described in CE1.

Figure 20:
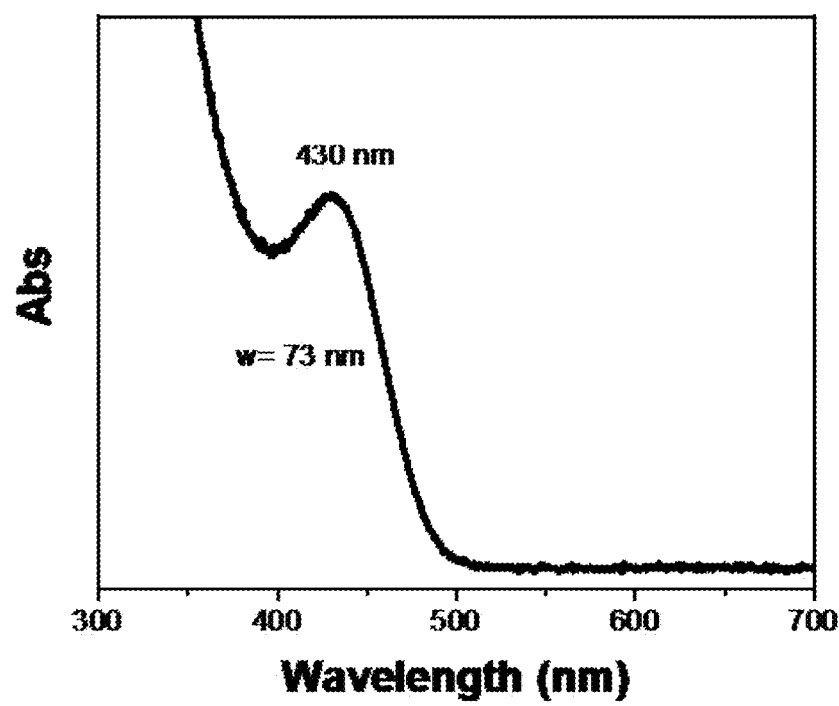
FIG. 20 is a UV-Vis absorption spectrum illustrating an absorption peak value of the InP cores of CE3.
Figure 21:
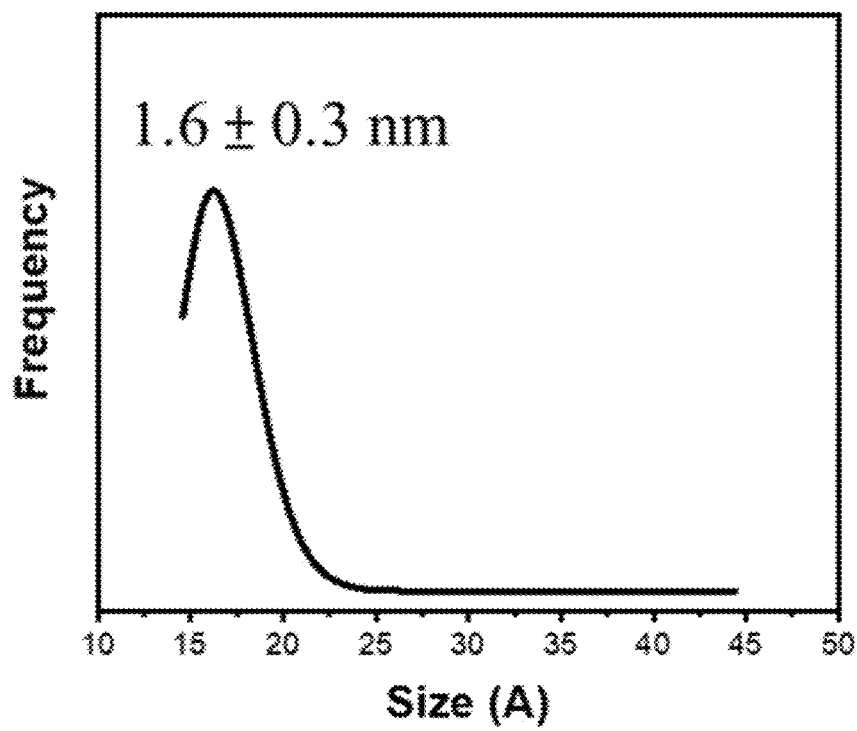
FIG. 21 is a curve illustrating particle size distribution of the InP cores of CE3.
Figure 22:
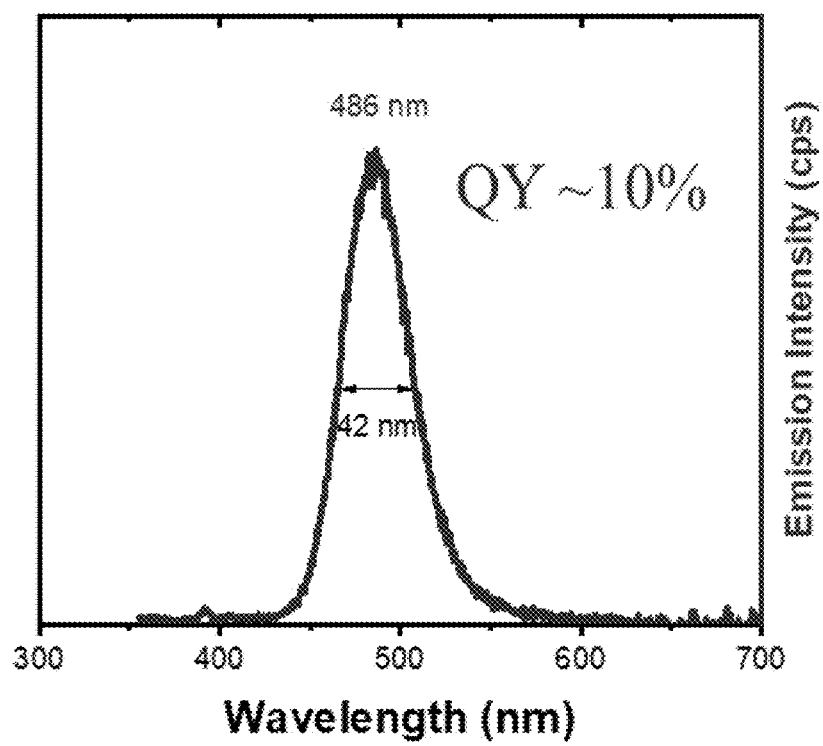
FIG. 22 is a PL spectrum illustrating an emission peak value and QY of the InP cores of CE3.

Referring to FIG. 20, compared to CE2, the UV-Vis absorption spectrum shows that the etched InP cores of CE3 has an increased absorption peak of 430 nm and a decreased FWHM value of 73 nm. The result suggests that, because of the $NH_4F$ etchant, the etched InP cores of CE3 have a smaller particle size distribution compared to the InP cores of CE2, and the InP/ZnSe core-shell quantum, dots of CE3 are more uniform in size compared to the InP/ZnSe core-shell quantum dots of CE2. The particle size of the InP core of CE3 can be calculated from the data shown in FIG. 20, and as shown in FIG. 21, the etched InP core of CE3 has a particle size of about 1.6±0.3 nm. Referring to FIG. 22, the PL spectrum shows that the InP core of CE3, after being radiated by UV light, has an emission wavelength of 486 nm and a FWHM value of 42 nm which is lower than that the FWHM value of the InP cores of CE2 (FWHM: 77 nm) and CE1 (FWHM: 50 nm). The decreased FWHM value indicates that the particle size distribution of the InP core of CE3 is narrower than that of CE1 and CE2, which may facilitate in obtaining quantum dots with uniform size. The InP core of CE3 have a QY of 10%, which is the same as that of the InP core of CE2, and which may be due to etching and removal of the oxide layer from the InP core by the $NH_4F$ etchant.

Figure 23:
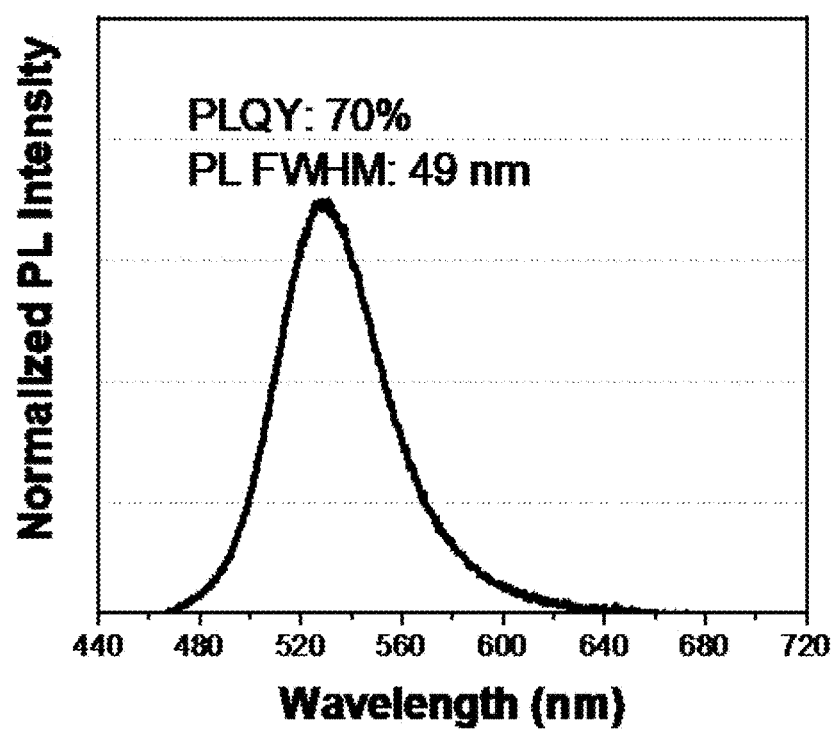
FIG. 23 is a PL spectrum illustrating the FWHM value and QY of the InP/ZnSe core-shell quantum dots of CE3.

Referring to FIG. 23, the InP/ZnSe core-shell quantum dot of CE3 has an emission wavelength of 528 nm and an FWHM value of 49 nm. The FWHM value of the InP/ZnSe core-shell quantum dots of CE3 is smaller than that of CE2 (FWHM: 59 nm), which indicates that the InP/ZnSe core-shell quantum dots of CE3 have a narrower particle size distribution. In addition, the InP/ZnSe core-shell quantum dots of CE3 have an improved QY of 70% compared to that of CE2 (QY: 59%). Nevertheless, even with the improved QY, the application of the InP/ZnSe core-shell quantum dots of CE3 is still limited.

Figure 24:
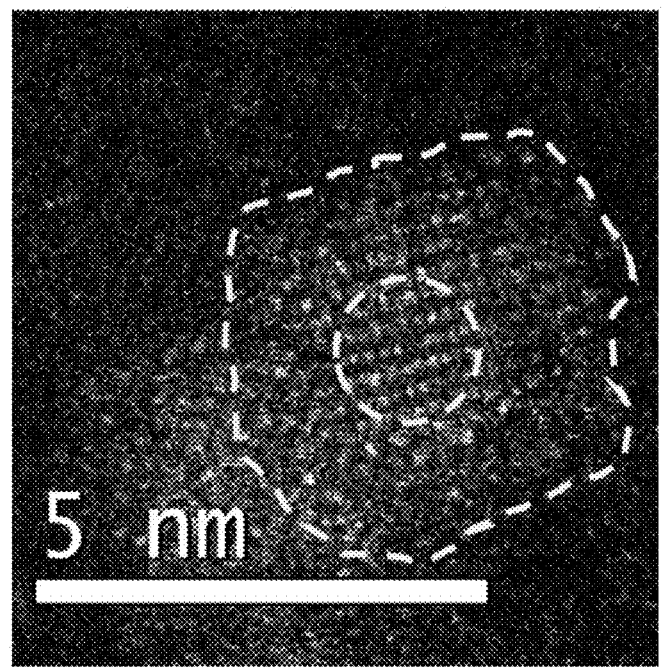
FIG. 24 is a HRSTEM image illustrating the microscopic structure of the InP/ZnSe core-shell quantum dots of CE3.
Figure 25:
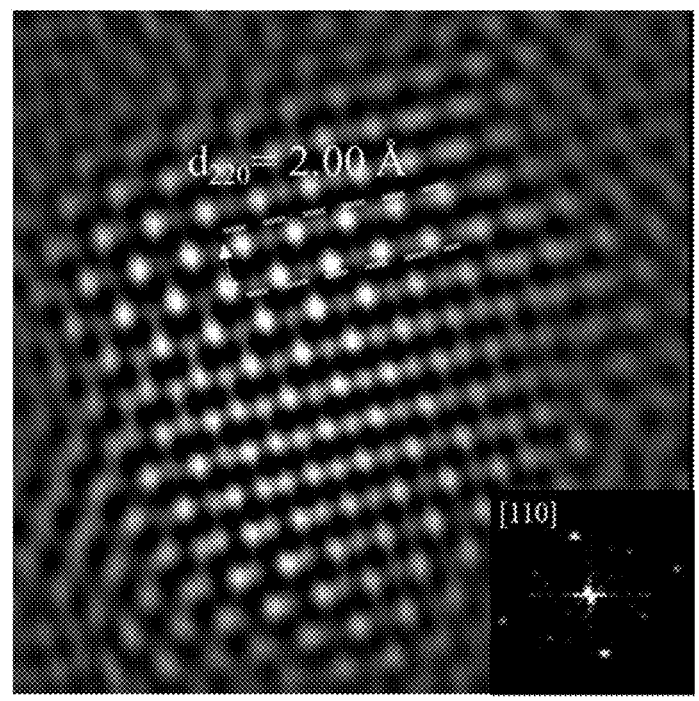
FIG. 25 is a SAED image and an IFFT image illustrating the crystal structure of the InP/ZnSe core-shell quantum dots of CE3.

Referring to FIG. 24, the HRSTEM image shows that the etched InP cores of CE3 have a particle size of about 1.7 nm, and the InP/ZnSe core-shell quantum dots of CE3 have a particle size of about 3 nm to 4 nm. Referring to the SAED pattern inserted at the right-bottom part of FIG. 25, it is shown that, with the [110] zone axis, the InP/ZnSe core-shell quantum dots of CE3 are face-centered cubic (fcc) single crystals. In addition, referring to FIG. 25, the IFFT image shows that the InP/ZnSe core-shell quantum dots of CE3 have a lattice point spacing on the (220) plane of about 2.00 Å.

Example 1 (E1)

The InP cores of E1 were made using procedures similar to that of CE1. However, in E1, after forming single crystal InP cores in the first mixture solution, a ZnSe inner shell growth procedure of E1 was immediately carried out, followed by an etching procedure similar to that of CE3.

The procedure for growing the ZnSe inner shell of E1 is disclosed hereinafter.

A first mixture solution containing single crystal InP cores of E1 was stirred at 300° C. for 5 minutes. Each of the InP cores in the first mixture has a core surface that has a first region and a second region. The first region of the core surface is inactive with oxygen, and the second region can be easily reacted with oxygen so that an oxide layer was formed on the second region. Thereafter, 0.75 mmol of Zn(OAc)$_2$, 1.5 mmol of an OA solution (i.e., a solution containing a precursor of Zn), and 0.75 mL of a TOPSe (1 M) solution were added into the first mixture solution of E1, so as to form a second mixture solution of E1. The second mixture solution of E1 was reacted at 300° C. for 5 minutes, so that an inner shell of ZnSe was grown on the first region of the core surface of each of the InP cores of E1. It is noted that the inner shell of ZnSe is relatively thin and contains about one or two atomic layers of ZnSe. The first three-neck round-bottom flask was then cooled to 50° C., followed by filtration of the second mixture solution of E1 using a polytetrafluoroethylene (PTFE) filter to obtain a filtered second mixture solution of E1. The filtered second mixture solution of E1 was stored in a glove box for subsequent procedures.

The etching procedure of E1 is similar to that of CE3, except that 0.5 M NH$_4$F was added dropwise into the filtered second mixture solution of E1 containing quantum dots each having the core of InP and the inner shell of ZnSe (simplified as "InP/ZnSe core-inner shell quantum dots"), so as to selectively etch the oxide layer formed on the second region of the core surface of the InP core. Therefore, the second region of the core surface of the InP core was exposed.

It is noted that, the InP/ZnSe core-inner shell quantum dots" of E1 has a relatively thin inner shell of ZnSe (approximately one or two atomic layers thick) and the core surface of the InP core is not completely covered by the inner shell, which is different from that of the conventional core-shell quantum dots.

It is known to a person skilled in the art that the core surface of the InP core, when not being processed (e.g., etched), contains a region (i.e., the aforesaid second region) that is formed with an oxide layer due to nucleation of the InP core under inevitable non-ideal conditions. The oxide layer disrupts the crystallinity of the core surface of the InP core, resulting in disordered crystal arrangement and low QY.

The fact that the inner shell of ZnSe tends to grow on the aforementioned first region of the core surface is because the first region of the core surface is inactive with oxygen. Thus, the energy barrier that is needed to be overcome for epitaxial growth of the inner shell of ZnSe on the first region is relatively low as compared to those of other planes with disordered crystal arrangements (i.e., the second region of the core surface). However, the inner shell of ZnSe can still grow on the second region of the core surface if the thickness of the inner shell of ZnSe is relatively large, which will result in the inner shell of ZnSe being formed on the entire core surface of the InP core, i.e., resulting in the same structure as that of the conventional ZnSe core-shell quantum dots. Therefore, in the present disclosure, by limiting the thickness of the inner shell of ZnSe formed on the core surface, the inner shell of ZnSe tends to grow only on the first region of the core surface and not on the second region of the core surface. The selective formation of the inner shell of ZnSe on the core surface provides protection to the first region of the core surface against subsequent etching process of the InP core. Such evidence is disclosed hereinafter.

Figure 26:
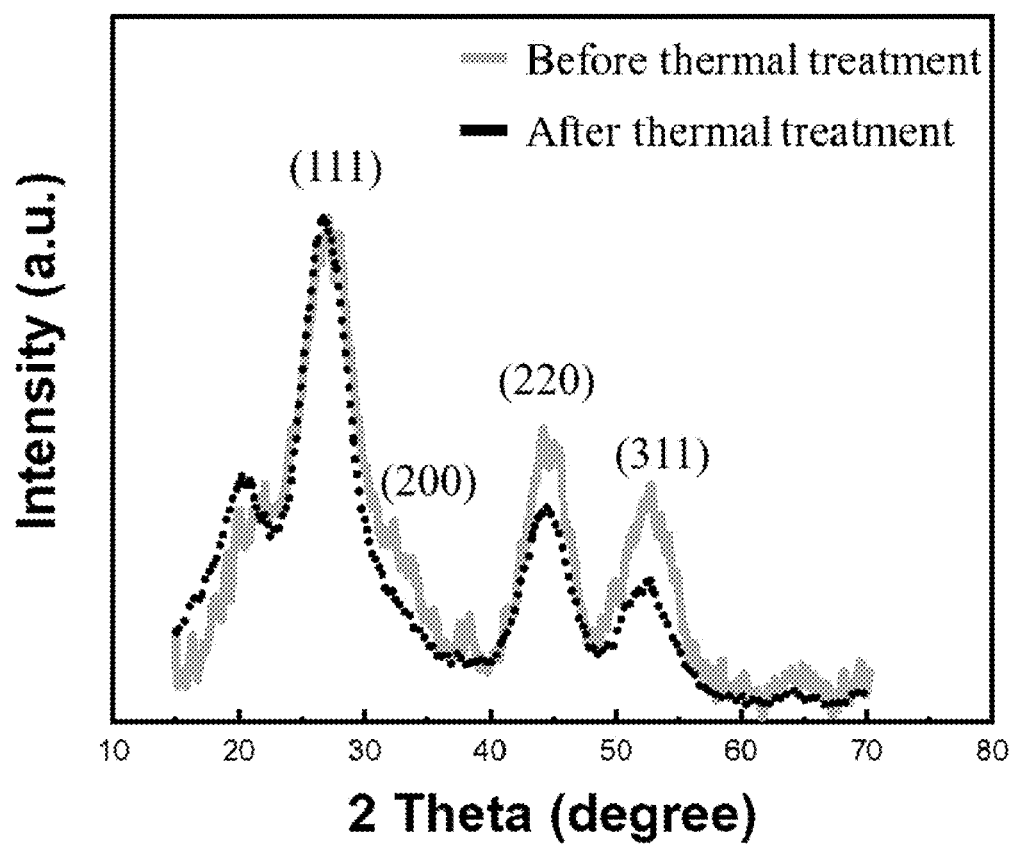
FIG. 26 is an X-ray diffraction (XRD) image illustrating crystallographic orientation of an InP/ZnSe core-inner shell quantum dot of Example 1 (E1) that is oxidized after thermal treatment.
Figure 27:
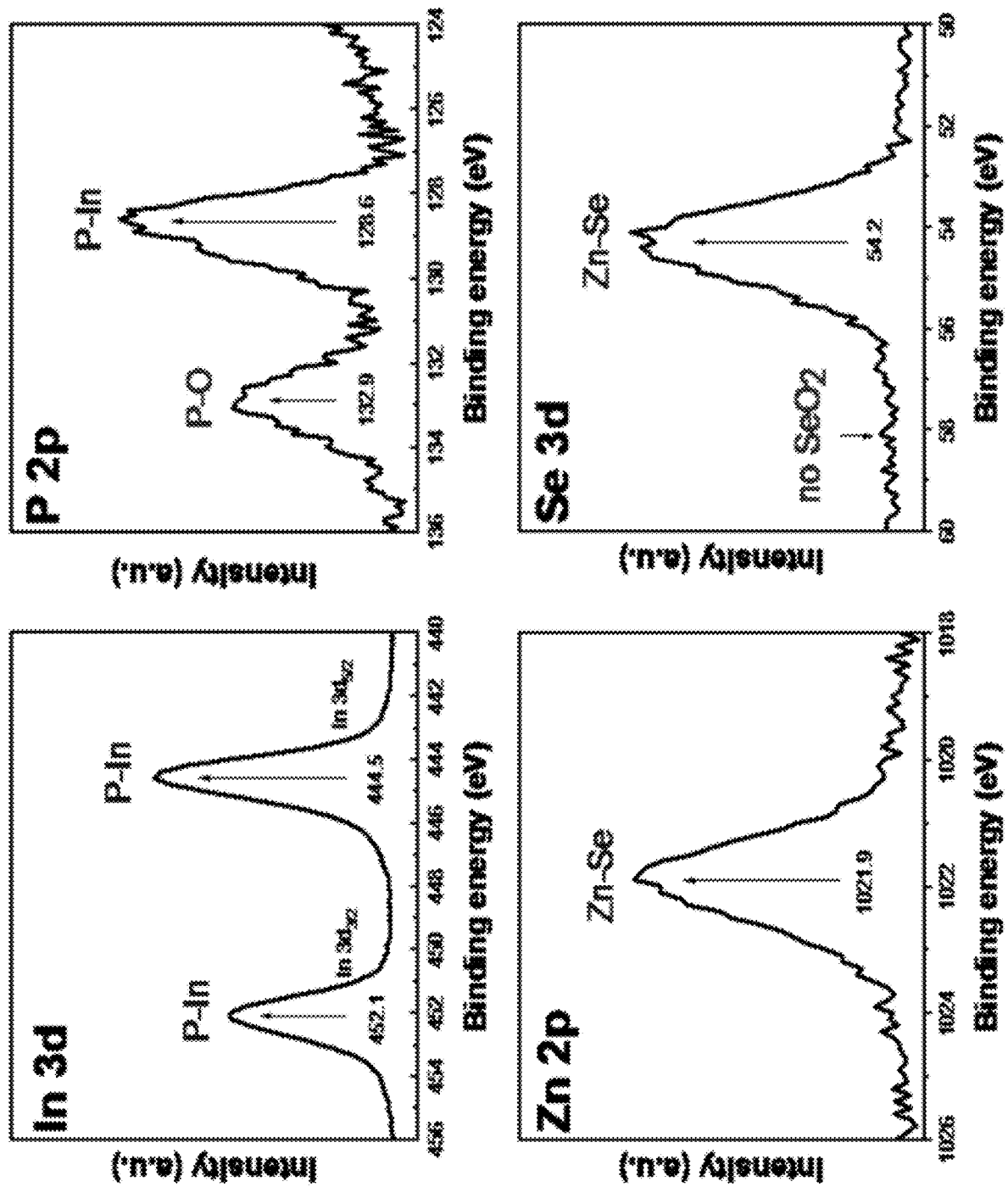
FIG. 27 are X-ray photoelectron spectrums (XPS) illustrating the location of an oxide on a surface of the InP/ZnSe core-inner shell quantum dot of E1 after thermal treatment.

Referring to FIG. 26, the XRD image shows that before thermal treatment, the InP/ZnSe core-inner shell quantum dots of E1 exhibit characteristic peaks at diffraction angles (2θ) of 25°, 30°, 45°, and 55°, corresponding to diffraction from the {111}, {200}, {220}, and {311} planes, respectively, of a zinc blend InP crystal lattice (according to Joint Committee on Powder Diffraction Standards (JCPDS) card No. 00-032-0452). Thermal treatment of the InP/ZnSe core-inner shell quantum dots of E1 was carried out at 150° C. for 10 minutes, and as shown in FIG. 26, after thermal treatment, only the intensity of the diffraction peak of the {111} plane remains the same, whereas intensity of the diffraction peaks of the {200}, {220}, and {311} planes has decreased. Decreased peak intensity of the {200}, {220}, and {311} planes indicates that the ability to reflect X-ray from these planes is reduced, suggesting that oxygen adsorbing on the {200}, {220}, and {311} planes is easily oxidized during thermal treatment, which thereby weakens the crystallinity of the {200}, {220}, and {311} planes (i.e., oxygen causes amorphization of the crystalline phase). Furthermore, by performing XPS analysis on the surface of the InP/ZnSe core-inner shell quantum dot of E1 after thermal treatment at 150° C. for 10 minutes, an oxidation peak (P—O) can be seen in the spectrum at a binding energy of 132.9 eV of the P 2p peak, whereas no oxidation peaks can be seen in the spectrum of the Zn 2p peak and the Se 3d peak (i.e., the ZnSe inner shell), suggesting that oxygen is reacted only with the core surface without ZnSe, indicating that the oxide layer is formed during the thermal treatment, and that the inner shell of ZnSe are formed on different regions of the core surface. In addition, it is known to a person skilled in the art that the {111} plane per se is relatively inactive with oxygen. Therefore, based on the results in FIGS. 26 and 27, it can be concluded that: (1) the inner shell of ZnSe is inactive with oxygen and can provide protection to the core surface against oxidation; (2) the {200}, {220}, and {311} planes are reactive with oxygen; and (3) the inner shell of ZnSe is not formed on the {200}, {220}, and {311} planes. In summary, in the quantum dot structure according to the present disclosure, the first region of the core surface of the InP core has the {111} plane, the second region of the core surface of the InP core has the {200}, {220}, and {311} planes, and the inner shell of ZnSe is formed on the {111} plane of the InP core, proving that the inner shell of ZnSe is intended to be formed on regions of the core surface with ordered crystal arrangement.

Figure 28:
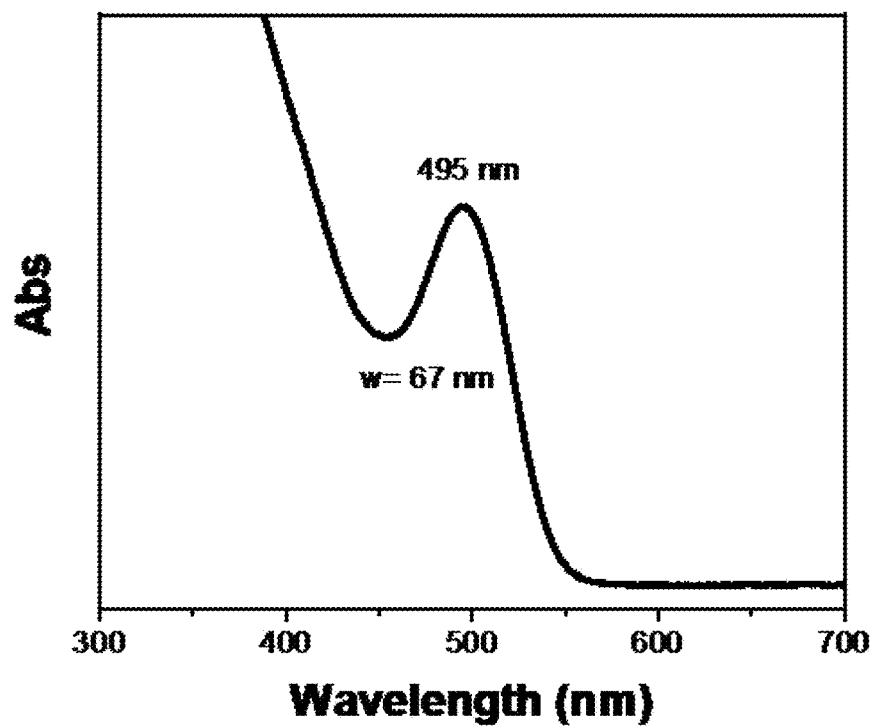
FIG. 28 is a UV-Vis absorption spectrum illustrating an absorption peak value of the InP/ZnSe core-inner shell quantum dots of E1.
Figure 29:
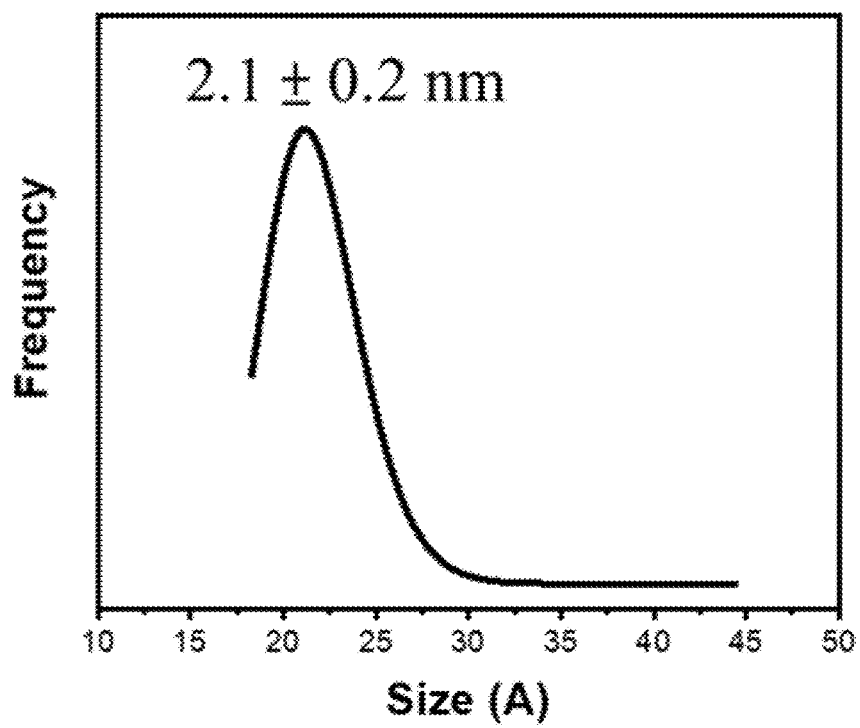
FIG. 29 is a curve illustrating particle size distribution of the InP/ZnSe core-inner shell quantum dots of E1.
Figure 30:
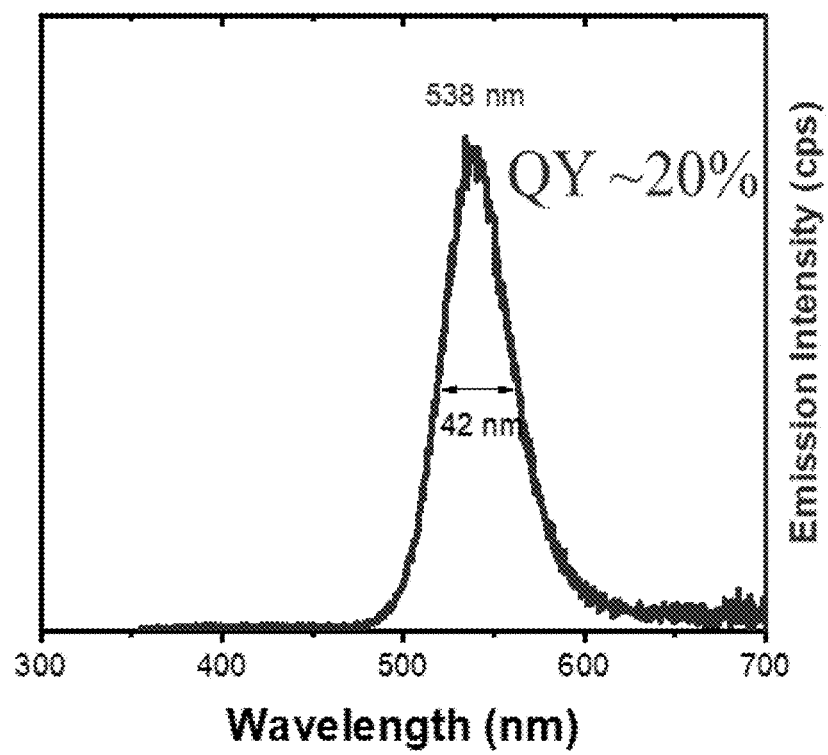
FIG. 30 is a PL spectrum illustrating an emission peak value and QY of the InP/ZnSe core-inner shell quantum dots of E1.

Referring to FIG. 28, compared to CE3, the UV-Vis absorption spectrum of E1 shows that the InP/ZnSe core-inner shell quantum dot of E1 has an increased absorption peak from 430 nm to 495 nm and a decreased FWHM value from 73 nm to 67 nm. The data suggest that, because of the ZnSe inner shell formed on the first region of the core surface of the InP core, the InP cores of E1 were etched less by $NH_4F$ than the InP cores of CE3, which resulting in a narrower particle size distribution than CE3, indicating that the InP/ZnSe core-inner shell quantum dots of E1 are more uniform in size than the InP cores of CE3. The particle size of the InP/ZnSe core-inner shell quantum dots of E1 can be calculated based on the data of FIG. 28, and as shown in FIG. 29, the InP/ZnSe core-inner shell quantum dots of E1 have a particle size of about 2.1±0.2 nm. Referring to FIG. 30, the InP/ZnSe core-inner shell quantum dots of E1 have an emission wavelength of 538 nm and an FWHM value of 42 nm after being radiated by UV light. Compared to the InP cores of CE3, the InP/ZnSe core-inner shell quantum dots of E1 have an increased QY of about 20%, which may be due to etching and removal of the oxide layer from the InP core by the $NH_4F$ etchant. Moreover, the InP/ZnSe core-inner shell quantum dots of E1 have an FWHM value of 42 nm, which is the same as that of the InP core of CE3, indicating that the particle size distribution of the InP/ZnSe core-inner shell quantum dots of E1 is the same as that of the InP core of CE3.

In sum, with the inner shell of ZnSe partially formed on the InP core, the InP/ZnSe core-inner shell quantum dots of E1 have an increased QY compared to those of the InP cores of CE1 to CE3 and have the same particle size distribution as the InP cores of CE3.

Example 2 (E2)

Quantum dots of E2 were prepared using procedures similar to those of E1, except that in E2, the fourth mixture solution containing OCA, ODE, and the InP/ZnSe core-inner shell quantum dots were further subjected to an outer shell growth procedure to grow an outer shell of ZnSeS on the InP/ZnSe core-inner shell quantum dots.

The ZnSeS outer shell growth procedure of E2 is disclosed hereinafter.

First, a mixture containing 2.2 mmol of $Zn(OAc)_2$, 8.9 mL of ODE, and 4.4 mmol of OA was added into a second three-neck round-bottom flask. The mixture was evacuated at 110° C. for 1 hour, followed by filling the second three-neck round-bottom flask with nitrogen gas to obtain a solution containing a precursor of Zn. Next, 8 mL of the fourth mixture solution and 0.17 mL of a solution containing a precursor of Se (i.e., TOPSe with a concentration of 1 M) were simultaneously injected into the second three-neck round-bottom flask. Thereafter, the second three-neck round-bottom flask was evacuated at 150° C. for 10 minutes. Next, the second three-neck round-bottom flask was heated to 300° C., followed by injection of 1.03 mL of a solution containing the precursor of Se and 0.51 mL of a solution containing a precursor of S (i.e., TOPS with a concentration of 2 M) so as to form a fifth mixture solution. The fifth mixture solution was then reacted at 300° C. for 6 minutes so that a first portion of a single crystal outer shell of ZnSeS was formed on the ZnSe inner shell, and a second portion of a single crystal outer shell of ZnSeS was formed on the second region of the core surface of the InP core, the first portion of the outer shell of ZnSeS being connected to the second portion of the outer shell of ZnSeS. A fifth mixture solution containing quantum dots of InP core, ZnSe inner shell, and ZnSeS outer shell (simplified as "InP/ZnSe/ZnSeS core-inner shell-outer shell quantum dots") of E2 was thus obtained. Last, the fifth mixture solution was cooled to room temperature, and was subjected to a centrifugation procedure the same as that of CE1 to collect the InP/ZnSe/ZnSeS core-inner shell-outer shell quantum dots of E2.

Figure 31:
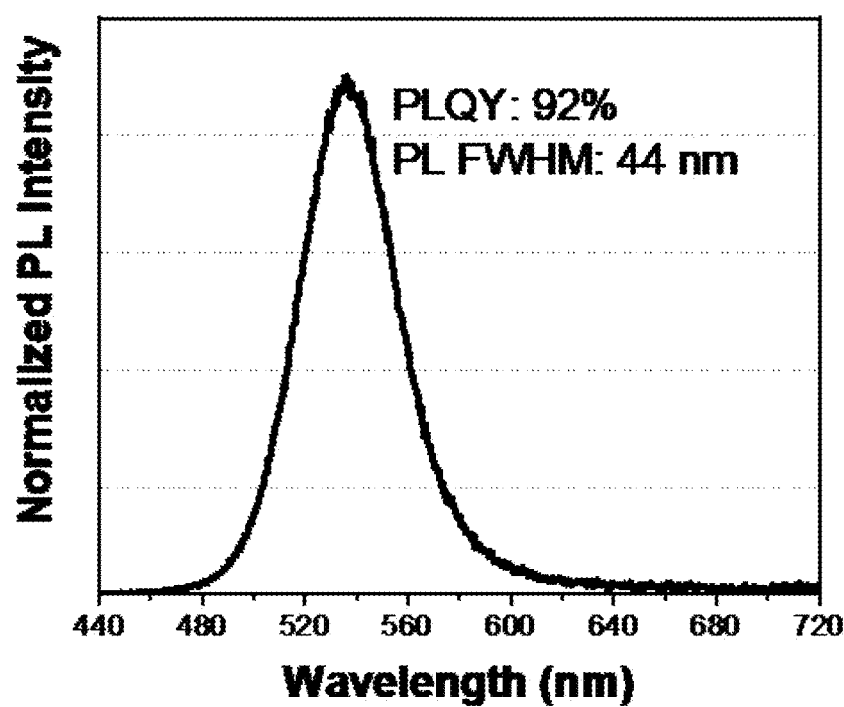
FIG. 31 is a PL spectrum illustrating the FWHM value and QY of the InP/ZnSe/ZnSeS core-inner shell-outer shell quantum dots of E2.

Referring to FIG. 31, the PL spectrum showed that the InP/ZnSe/ZnSeS core-inner shell-outer shell quantum dots of E2 have an emission wavelength of 536 nm and an FWHM value of 44 nm after being radiated by UV light. The InP/ZnSe/ZnSeS core-inner shell-outer shell quantum dots of E2 have an increased QY of 92% compared to that of the InP/ZnSe core-shell quantum dots of CE3 (70%), which may be due to the InP cores being protected by the inner shell of ZnSe from being etched by $NH_4F$. Moreover, the InP/ZnSe/ZnSeS core-inner shell-outer shell quantum dots of E2 have an FWHM value of 42 nm, indicating that the particle size distribution of the InP/ZnSe/ZnSeS core-inner shell-outer shell quantum dots of E2 is lower than the InP/ZnSe core-shell quantum dots of CE3 (FWHM: 49 nm), suggesting that the procedures of E2 is advantageous for obtaining quantum dots with uniform size.

Figure 32:
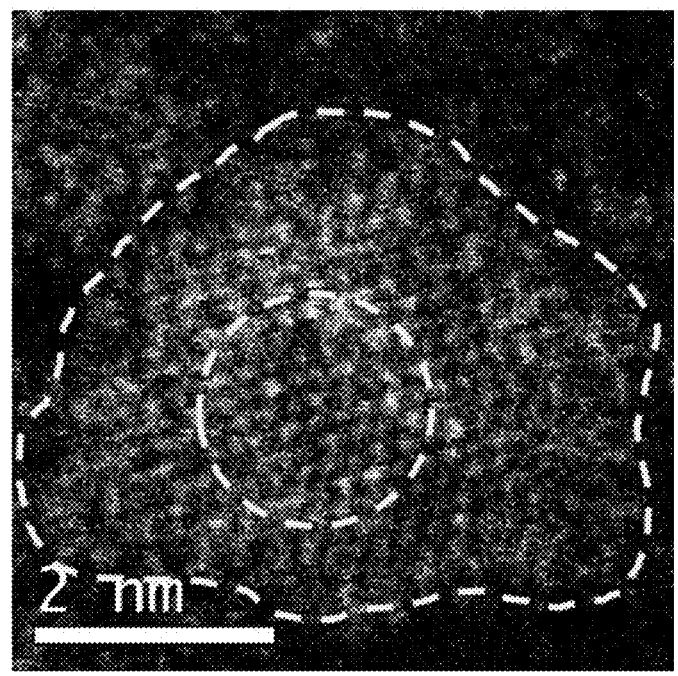
FIG. 32 is a HRSTEM image illustrating the microscopic structure of the InP/ZnSe/ZnSeS core-inner shell-outer shell quantum dots of E2.
Figure 33:
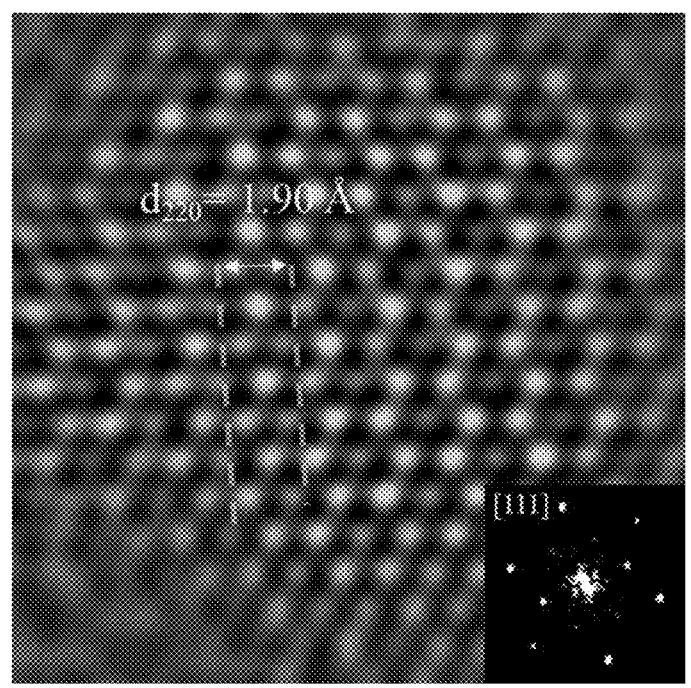
FIG. 33 is a SAED image and an IFFT image illustrating the crystal structure of the InP/ZnSe/ZnSeS core-inner shell-outer shell quantum dots of E2.

Referring to FIG. 32, the HRSTEM image shows that the InP cores of E2 have a particle size of about 2.0 nm, and the InP/ZnSe/ZnSeS core-inner shell-outer shell quantum dots of E2 have a particle size of about 4 nm to 5 nm. Referring to the SAED pattern inserted in right-bottom part of FIG. 33, it is shown that, with the [111] zone axis, the InP/ZnSe/ZnSeS core-inner shell-outer shell quantum dots of E2 are face-centered cubic (fcc) single crystals. In addition, referring to FIG. 33, the IFFT image shows that the InP/ZnSe/ZnSeS core-inner shell-outer shell quantum dots of E2 have a lattice point spacing on the (220) plane of about 1.90 Å.

Example 3 (E3)

Quantum dots of InP core, ZnSe inner shell, and ZnSe outer shell (simplified as "InP/ZnSe/ZnSe core-inner shell-outer shell quantum dots") of E3 were prepared using procedures similar to those of E2, except that in E3, the fourth mixture solution containing OCA, ODE, and the InP/ZnSe core-inner shell quantum dots was further subjected to an outer shell growth procedure to grow an outer shell of ZnSe on the InP/ZnSe core-inner shell quantum dots. The outer shell growth procedure is similar to that of E2, and is described in detail as follows.

First, 8 mL of the fourth mixture solution containing the InP/ZnSe core-inner shell quantum dots and 0.17 mL of a solution containing a precursor of Se (i.e., TOPSe with a concentration of 1 M) were simultaneously injected into the second three-neck round-bottom flask that had the solution containing the precursor of Zn, followed by evacuation at 150° C. for 10 minutes. The second three-neck round-bottom flask was then heated to 300° C., and 2.06 mL of the solution containing the precursor of Se (i.e., TOPSe with a concentration of 1 M) was injected into the second three-neck round-bottom flask so as to obtain a fifth mixture solution of E3, followed by reaction at 300° C. for 6 minutes so that a first portion of a single crystal outer shell of ZnSe was formed on the inner shell of ZnSe, and a second portion of a single crystal outer shell of ZnSe was formed on the second region of the core surface of the InP core. The first portion of the outer shell of ZnSe and the second portion of the outer shell of ZnSe were connected. A fifth mixture solution containing InP/ZnSe/ZnSe core-inner shell-outer shell quantum dots was thus obtained.

Figure 34:
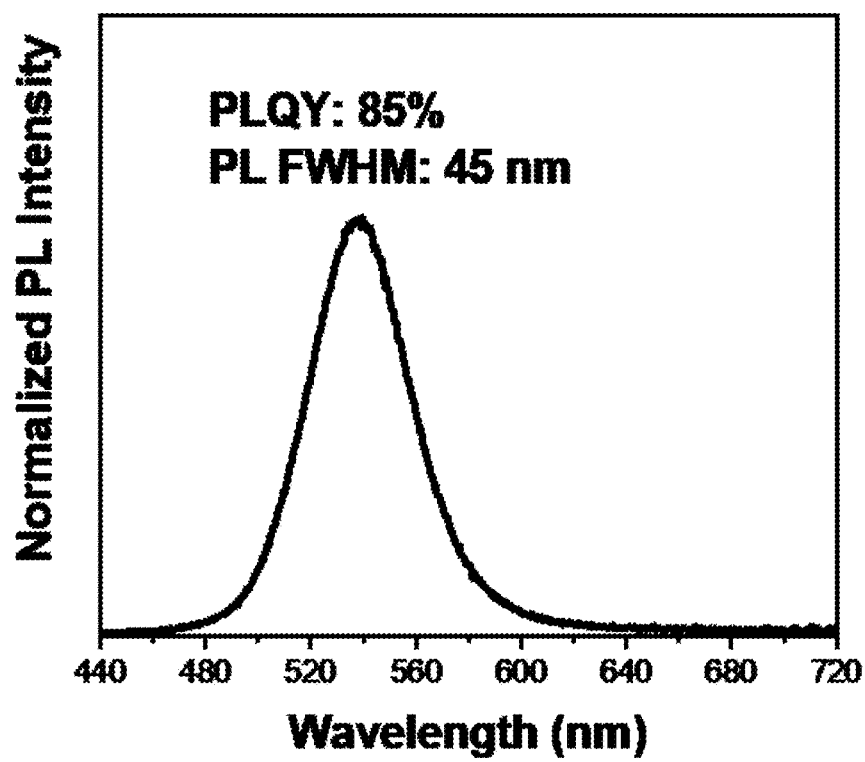
FIG. 34 is a PL spectrum illustrating the FWHM value and QY of the InP/ZnSe/ZnSe core-inner shell-outer shell quantum dots of E3.

Referring to FIG. 34, the PL spectrum shows that the InP/ZnSe/ZnSe core-inner shell-outer shell quantum dots of E3 have an emission wavelength of 538 nm and an FWHM value of 45 nm after being radiated by UV light. Compared to the InP/ZnSe core-shell quantum dots of CE3, the InP/ZnSe/ZnSe core-inner shell-outer shell quantum dots of E3 have an increased QY of 85% and a decreased FWHM value of 45 nm, which may be due to the InP cores being protected by the inner shell of ZnSe from being etched by $NH_4F$. Moreover, the InP/ZnSe/ZnSe core-inner shell-outer shell quantum dots of E3 have an FWHM value of 45 nm, which indicates that the particle size distribution is smaller than the InP/ZnSe core-shell quantum dots of CE3 (FWHM: 49 nm), suggesting that the procedures of E3 is advantageous for obtaining quantum dots with uniform size.

Figure 35:
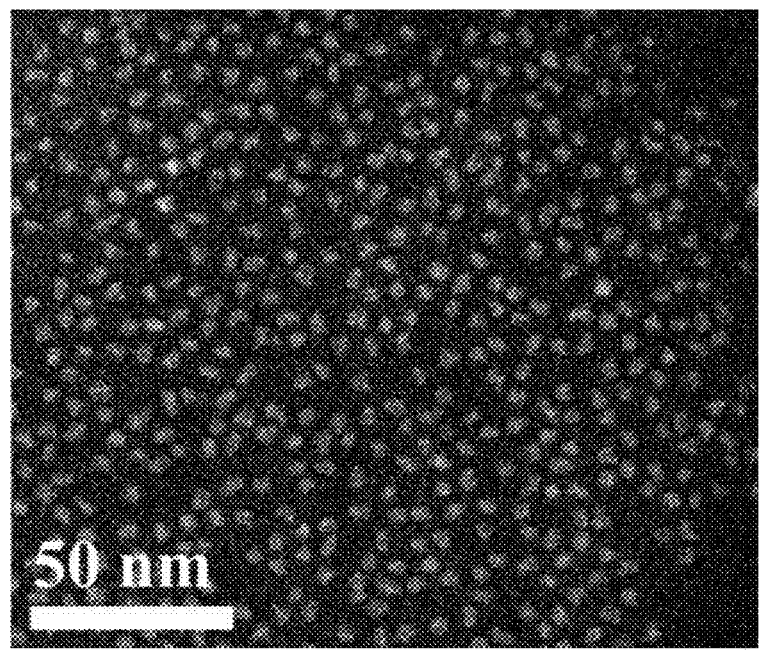
FIG. 35 is a STEM image illustrating the particle size distribution of the InP/ZnSe/ZnSe core-inner shell-outer shell quantum dots of E3.
Figure 36:
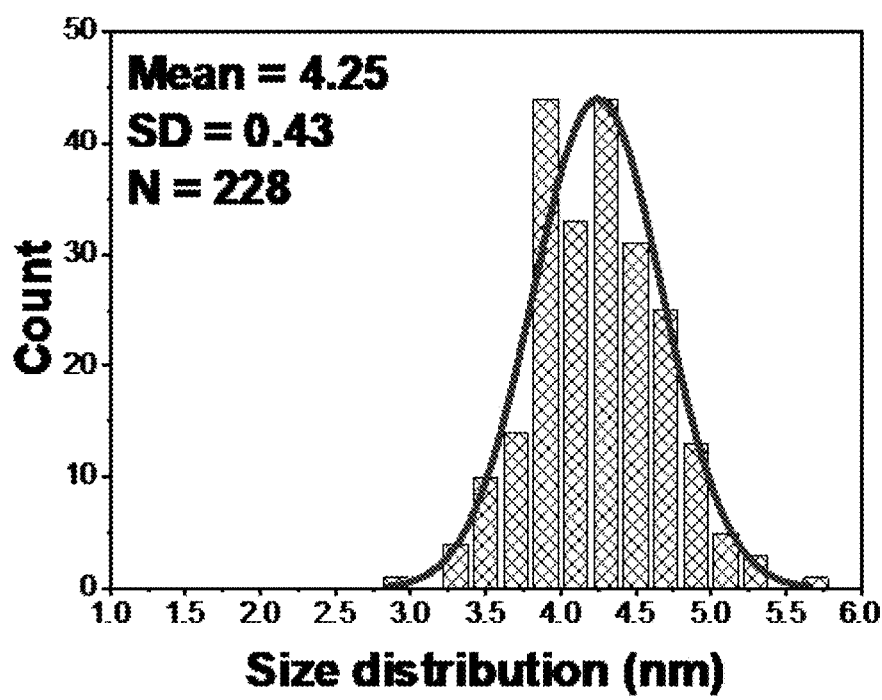
FIG. 36 is a histogram illustrating particle size distribution of the InP/ZnSe/ZnSe core-inner shell-outer shell quantum dots of E3, which is obtained by calculating the data of FIG. 35.

Referring to FIG. 35, the STEM image shows that the InP/ZnSe/ZnSe core-inner shell-outer shell quantum dots of E3 have a particle size of about 4 nm to 5 nm. In addition, as shown by the histogram in FIG. 36, which was obtained by analyzing the data of FIG. 35, the average particle size of the InP/ZnSe/ZnSe core-inner shell-outer shell quantum dots of E3 (sample size: 228) is about 4.25 nm, with a SD of 0.43 nm.

Figure 37:
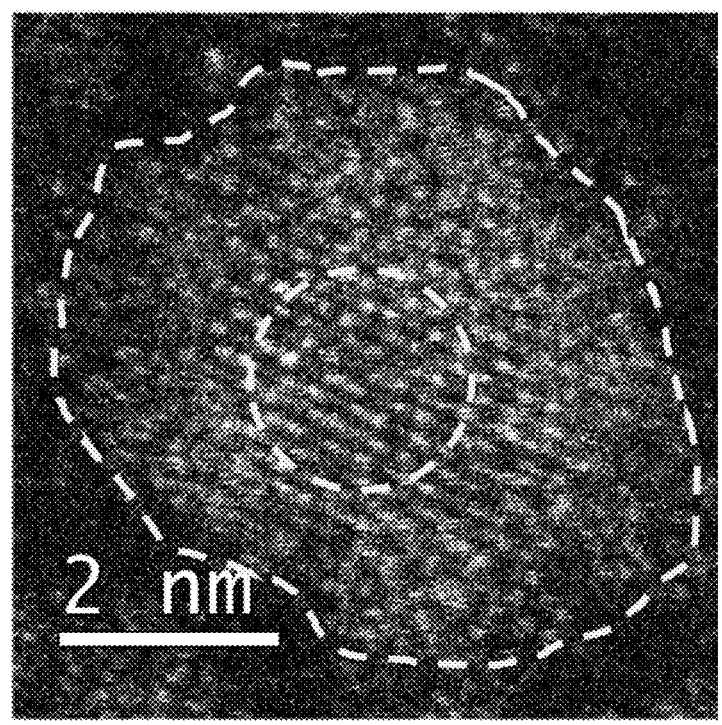
FIG. 37 is a HRSTEM image illustrating the microscopic structure of the InP/ZnSe/ZnSe core-inner shell-outer shell quantum dots of E3.
Figure 38:
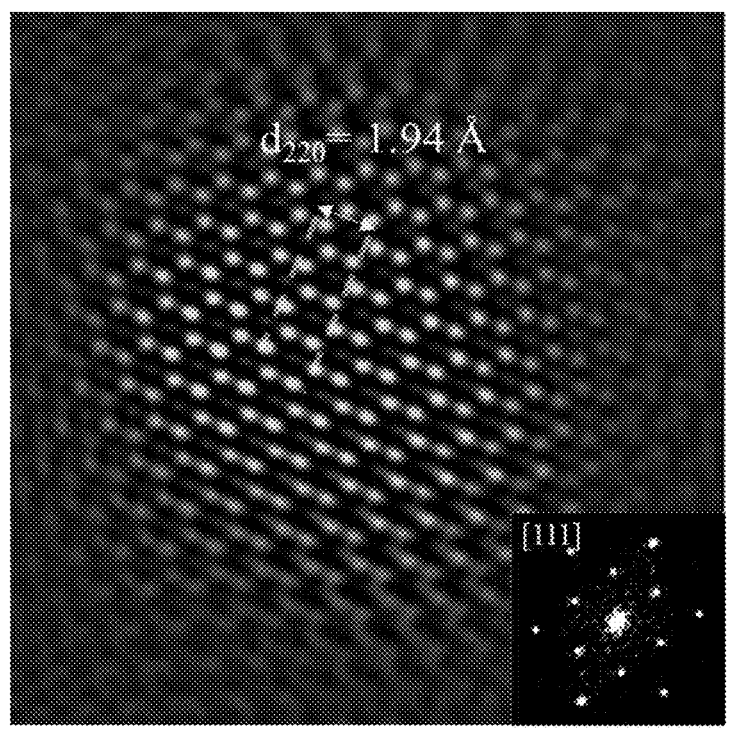
FIG. 38 is a SAED image and an IFFT image illustrating the crystal structure of the InP/ZnSe/ZnSe core-inner shell-outer shell quantum dots of E3.

Referring to FIG. 37, the HRSTEM image shows that the InP cores of E3 have a particle size of about 2.0 nm, and the InP/ZnSe/ZnSe core-inner shell-outer shell quantum dots of E3 have a particle size of about 4 nm to 5 nm. As shown by the SAED pattern inserted in right-bottom part of FIG. 38, it is shown that, with the [111] zone axis, the InP/ZnSe/ZnSe core-inner shell-outer shell quantum dots of E3 are face-centered cubic (fcc) single crystals. In addition, referring to FIG. 38, the IFFT image shows that the InP/ZnSe/ZnSe core-inner shell-outer shell quantum dots of E3 have a lattice point spacing on the (220) plane of about 1.94 Å.

Example 4 (E4)

Quantum dots of InP core, ZnSe inner shell, and ZnSe/ZnS outer shell (simplified as "InP/ZnSe/(ZnSe/ZnS) core-inner shell-outer shell quantum dots") of E4 were prepared using procedures similar to those of E2, except that in E4, the fourth mixture solution containing OCA, ODE, and the InP/ZnSe core-inner shell quantum dots was subjected to a ZnSe/ZnS outer shell growth procedure.

The ZnSe/ZnS outer shell growth procedure of E4 is disclosed hereinafter.

First, a mixture of 4.4 mmol of $Zn(OAc)_2$, 8.9 mL of ODE, and 8.8 mmol of OA was added into a three-neck round-bottom flask (flask volume: 50 mL). The mixture was then evacuated at 110° C. for 1 hour, followed by filling the three-neck round-bottom flask with nitrogen gas so as to obtain a solution containing a precursor of Zn. Thereafter, 8 mL of the fourth mixture solution (containing the InP/ZnSe core-inner shell quantum dots) and 0.17 mL of a solution containing a precursor of Se (i.e., TOPSe with a concentration of 1 M) were simultaneously injected into the three-neck round-bottom flask with the solution containing the precursor of Zn, followed by evacuation at 150° C. for 10 minutes. The three-neck round-bottom flask was then heated to 300° C., followed by injection of 3.09 mL of a precursor of Se (TOPSe, 1 M) and reaction at the temperature for 12 minutes. Next, the three-neck round-bottom flask was heated to 310° C., and 0.51 mL of a precursor of S (TOPS with a concentration of 2 M) was added into the three-neck round-bottom flask, followed by reaction for 6 minutes at the temperature so that a first portion of a single crystal outer shell of ZnSe/ZnS was formed on the inner shell of ZnSe, and a second portion of a single crystal outer shell of ZnSe/ZnS was formed on the second region of the core surface of the InP core. A fifth mixture solution containing InP/ZnSe/(ZnSe/ZnS) core-inner shell-outer shell quantum dots of E4 was thus obtained.

Figure 39:
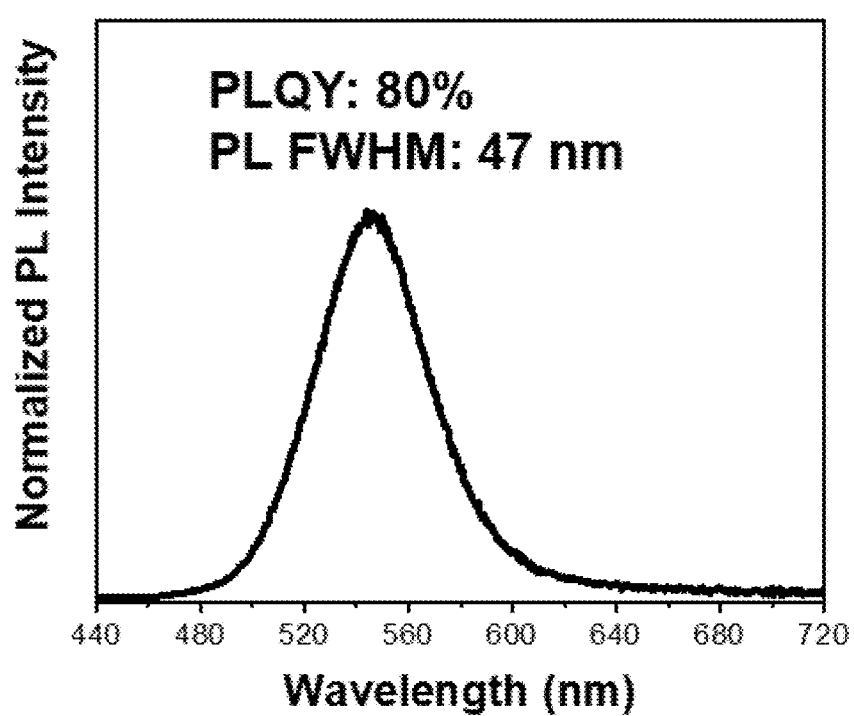
FIG. 39 is a PL spectrum illustrating the FWHM value and QY of the InP/ZnSe/(ZnSe/ZnS) core-inner shell-outer shell quantum dots of E4.

Referring to FIG. 39, the PL spectrum show that the InP/ZnSe/(ZnSe/ZnS) core-inner shell-outer shell quantum dots of E4 have an emission wavelength of 545 nm and a FWHM value of 47 nm after being radiated by UV light. The InP/ZnSe/(ZnSe/ZnS) core-inner shell-outer shell quantum dots of E4 have an increased QY of 80% compared to that of the InP/ZnSe core-shell quantum dots of CE3 (70%), which may be due to the InP cores being protected by the inner shell of ZnSe from being etched by $NH_4F$. Moreover, the InP/ZnSe/(ZnSe/ZnS) core-inner shell-outer shell quantum dots of E4 have an FWHM value of 47 nm, which indicates that the particle size distribution is smaller than the InP/ZnSe core-shell quantum dots of CE3 (FWHM: 49 nm), suggesting that the procedures of E4 is advantageous for obtaining quantum dots of uniform size.

Figure 40:
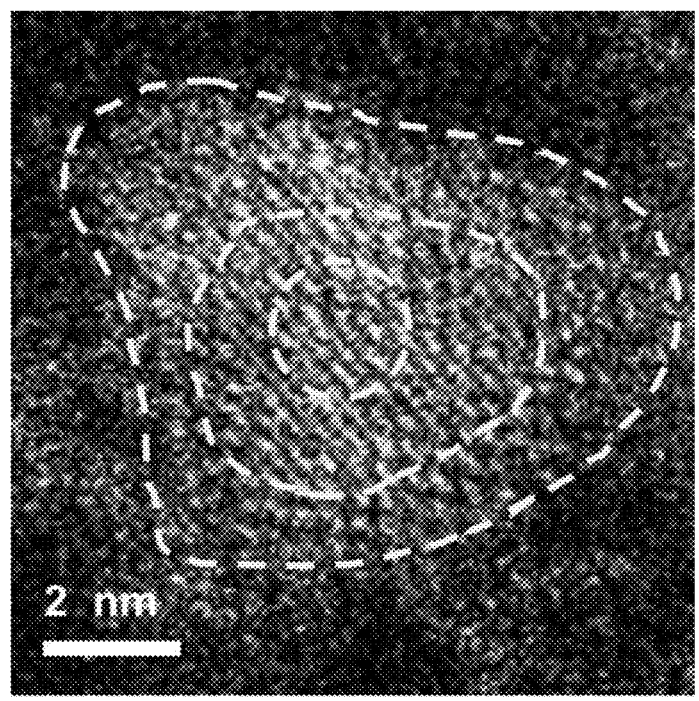
FIG. 40 is a HRSTEM image illustrating the microscopic structure of the InP/ZnSe/(ZnSe/ZnS) core-inner shell-outer shell quantum dots of E4.
Figure 41:
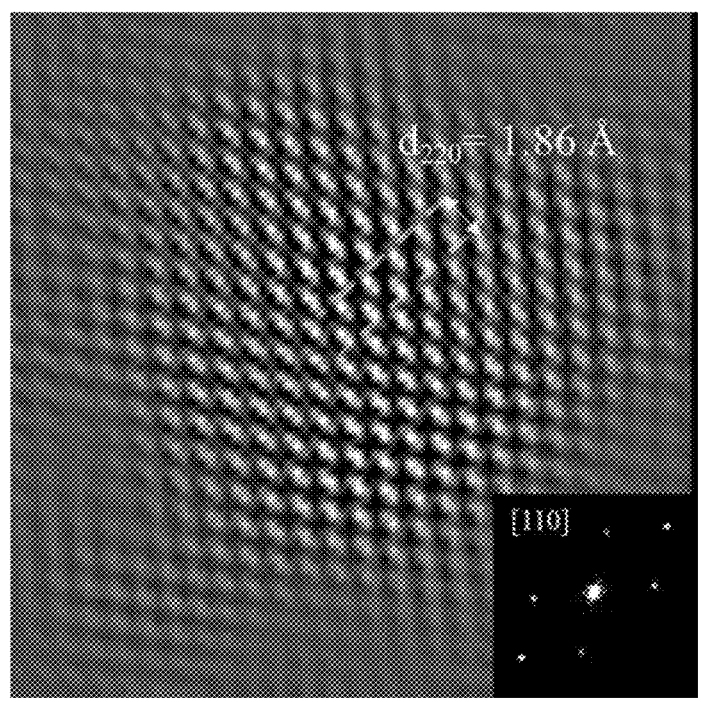
FIG. 41 is a SAED image and an IFFT image illustrating the nanocrystal structure of the InP/ZnSe/(ZnSe/ZnS) core-inner shell-outer shell quantum dots of E4.

Referring to FIG. 40, the HRSTEM image shows that the InP cores of E4 (shown as the innermost dotted circle in FIG. 40) have a particle size of about 2.0 nm, and the InP/ZnSe/(ZnSe/ZnS) core-inner shell-outer shell quantum dots of E4 have a particle size of about 7 nm to 8 nm. As shown by the SAED pattern inserted in right-bottom part of FIG. 41, it is shown that, with the [110] zone axis, the InP/ZnSe/(ZnSe/ZnS) core-inner shell-outer shell quantum dots of E4 are face-centered cubic (fcc) single crystals. In addition, referring to FIG. 41, the IFFT image shows that the InP/ZnSe/(ZnSe/ZnS) core-inner shell-outer shell quantum dots of E4 have a lattice point spacing on the (220) plane of about 1.86 Å.

Stability Evaluation

Chemical Stability Test

Stable quantum dots exhibit a relatively small decrease in their photoluminescence quantum yield (PLQY) after a purification process. To evaluate the chemical stability of the quantum dots, multiple rounds of purifications were performed on the quantum dots of E3 and CE3. The results are shown in FIG. 42.

Figure 42:
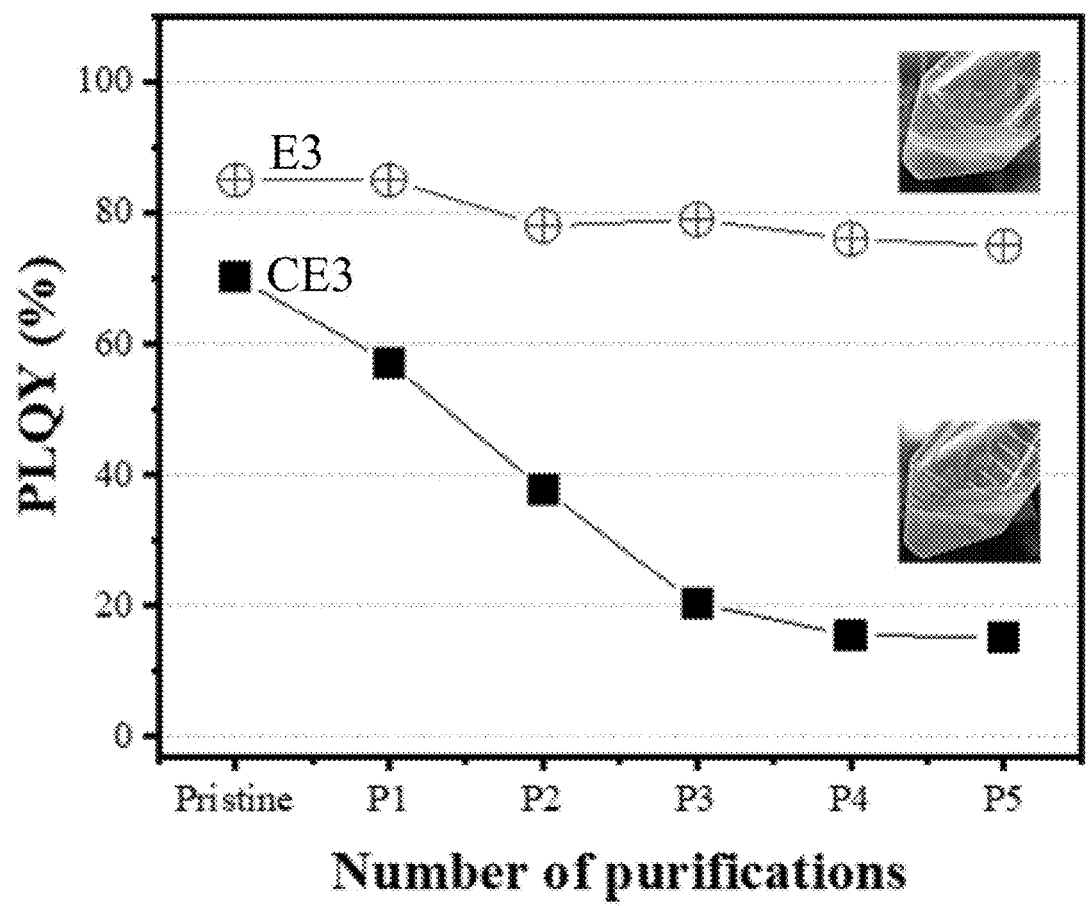
FIG. 42 is a plot illustrating changes in PLQY of the quantum dots of E3 and CE3 after going through multiple rounds of purification.

According to FIG. 42, it can be seen that the PLQY of the InP/ZnSe/ZnSe core-inner shell-outer shell quantum dots of E3, after going through one round of purification, is about the same as that before going through purification, whereas the PLQY of the InP/ZnSe core-shell quantum dots of CE3, after going through one round of purification, is decreased from about 70% to about 58%. The relatively small change in PLQY after one round of purification indicates that the InP/ZnSe/ZnSe core-inner shell-outer shell quantum dots have better chemical stability than the InP/ZnSe core-shell quantum dots of CE3. In addition, after 5 rounds of purification, the PLQY of InP/ZnSe/ZnSe core-inner shell-outer shell quantum dots decreases from about 85% to about 75%, whereas the PLQY of the InP/ZnSe core-shell quantum dots of CE3 decreases drastically from about 70% to about 16%. In summary, the quantum dot structure of the present disclosure exhibits excellent chemical stability compared to the conventional quantum dot structures (i.e., comparative examples).

As disclosed in CN 111592877 A and Yu-Ho Won et al. (2019), Nature, 575:634-638 (see the BACKGROUND section), oxides (e.g., the oxide layer) formed on the surface of the InP cores can be etched using an etchant such as $NH_4F$. However, $NH_4F$ also etches the InP cores, which causes difficulty in controlling the size and emission wavelength of the quantum dots. As reported by Yu-Ho Won et al. (2019), *Nature,* 575:634-638, the diluted HF is added at 180° C., which would release toxic gas and is highly dangerous.

In contrast, it can be seen from the examples of the present disclosure that, by forming an inner shell on the quantum dot core before etching, the core can be protected from being etched by diluted $NH_4F$, which facilitates in maintaining the size of the InP cores and increases the stability of the quantum dot structure. In addition, the etching procedure of the present disclosure is carried out under room temperature, which greatly reduces the risk of toxic gas being released. Moreover, the cores of the quantum dots of the present disclosure have a maximal particle size of about 2 nm, indicating that reaction time and production cost can be further reduced compared to that disclosed in Yu-Ho Won et al. (2019), *Nature,* 575:634-638. Finally, a ligand-exchange procedure is carried out (see step (f) to step (g)) after the etching procedure and before the outer shell growth procedure as mentioned in E2, E3, and E4, which can avoid leaving residual $NH_4F$ on the surface of the InP/ZnSe core-inner shell quantum dots, thereby increasing the yield of product made by the method for making the quantum dot structure of the present disclosure. Therefore, the examples disclosed in the present disclosure enables production of quantum dot structure with excellent stability and high QY, i.e., between 80% and 92%, under the premise of saving material cost and manufacturing cost.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure. While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A quantum dot structure, comprising:
a core that is a single crystal of a compound M1C1 and that has a core surface, said core surface having a first region and a second region, said first region having a crystal plane that is inactive with oxygen, said second region having a crystal plane that is easily reactive with oxygen; and
an inner shell that is a single crystal of a compound M2C2 and that is formed on said first region of said core surface,
wherein M1 is an element selected from the group consisting of Al, Ga, and In, and C1 is an element selected from the group consisting of P, As, and combinations thereof, and M2 is an element selected from the group consisting of Zn, Pb, Ag, Cu, Mn, Cd, and Mg, and C2 is an element selected from the group consisting of S, Se, O, F, Cl, Br, I, Te, and combinations thereof.

2. The quantum dot structure as claimed in claim 1, wherein said inner shell has a thickness ranging from 1 Å to 10 Å.

3. The quantum dot structure as claimed in claim 1, further comprising an outer shell that is a single crystal of a compound M2C2 and that includes
a first portion that is formed on said inner shell, and
a second portion that is formed on said second region of said core surface, and that is connected to said first portion of said outer shell.

4. The quantum dot structure as claimed in claim 3, wherein said compound M2C2 of said outer shell is different from said compound of M2C2 of said inner shell.

5. The quantum dot structure as claimed in claim 3, wherein said compound M1C1 of said core is InP.

6. The quantum dot structure as claimed in claim 5, wherein said compound M2C2 of said inner shell is Zn Se.

7. The quantum dot structure as claimed in claim 6, wherein said compound M2C2 of said outer shell is one of ZnSe, ZnSeS, ZnS, and combinations thereof.

8. The quantum dot structure as claimed in claim 7, wherein said first region has the crystal plane of {111}, and said second crystal region has at least one of the crystal planes of {311}, {220}, and {200}.

9. A method for making a quantum dot structure, comprising the steps of:
a) mixing a solution containing a precursor of M1 with a solution containing a precursor of C1, and reacting the precursor of M1 with the precursor of C1 to obtain a first mixture solution containing a core that is a single crystal of a compound M1C1, the core having a core surface that has a first region and a second region, the first region being inactive with oxygen, the second region being oxidized by oxygen present in the first mixture solution to form an oxide layer thereon;
b) adding a solution containing a precursor of M2 and a solution containing a precursor of C2 into the first mixture solution and growing a compound M2C2 on the first region of the core surface so as to obtain a second mixture solution containing a first quantum dot that has the core and an inner shell of the compound M2C2 formed only on the first region of the core;
c) adding dropwise an etchant into the second mixture solution to selectively etch the oxide layer formed on the second region;
d) diluting the etchant in the second mixture solution to terminate etching of the oxide layer;
e) filtering the second mixture solution to obtain the first quantum dot that has the core and the inner shell formed on the core;
f) adding the first quantum dot obtained in step e) into a dispersant-containing solution to obtain a third mixture solution;
g) settling the third mixture solution;
h) after step g), filtering the third mixture solution to remove residue of the etchant from the first quantum dot so as to obtain a fourth mixture solution containing the first quantum dot; and i) mixing the fourth mixture solution with the solution containing the precursor of M2 and the solution containing the precursor of C2, and growing an outer shell of a single crystal of a compound M2C2 on the second region of the core surface and the inner shell, the outer shell including a first portion and a second portion, the first portion being grown on the inner shell, the second portion being grown on the second region of the core surface and being connected to the first portion, wherein M1 is an element selected from the group consisting of Al, Ga, and In, and C1 is an element selected from the group consisting of P, As, and combinations thereof, and M2 is an element selected from the group consisting of Zn, Pb, Ag, Cu, Mn, Cd, and Mg, and C2 is an element selected from the group consisting of S, Se, O, F, Cl, Br, I, Te, and combinations thereof.

10. The method as claimed in claim 9, wherein the compound M2C2 of the outer shell is different from the compound of M2C2 of the inner shell.

11. The method as claimed in claim 9, wherein the compound M1C1 of the core is InP.

12. The method as claimed in claim 11, wherein the compound M2C2 of the inner shell is ZnSe.

13. The method as claimed in claim 12, wherein the compound of M2C2 of the outer shell is one of ZnSe, ZnSeS, ZnS, and combinations thereof.

14. The method as claimed in claim 13, wherein the first region has a crystal plane of {111}, and the second region has at least one of crystal planes of {311}, {220}, and {200}.

15. The method as claimed in claim 9, wherein the etchant is a fluoride-containing etchant.

16. The method as claimed in claim 9, wherein, in step c), a molar ratio of the etchant to the second mixture solution ranges between 700:1 and 2000:1.

17. The method as claimed in claim 9, wherein, in step f), a molar ratio of the dispersant to the first quantum dot ranges between 50:1 and 2000:1.

18. The method as claimed in claim 9, wherein, in step c), the etching is conducted at room temperature.

19. The method as claimed in claim 9, wherein the inner shell has a thickness ranging from 1 Å-10 Å.

20. A method for making a quantum dot structure, comprising the steps of:

a) mixing a solution containing a precursor of M1 with a solution containing a precursor of C1, and reacting the precursor of M1 with the precursor of C1 to obtain a first mixture solution containing a core that is a single crystal of a compound M1C1, the core having a core surface that has a first region and a second region, the first region being inactive with oxygen, the second region being oxidized by oxygen present in the first mixture solution to form an oxide layer thereon;

b) adding a solution containing a precursor of M2 and a solution containing a precursor of C2 into the first mixture solution and growing a compound M2C2 on the first region of the core surface so as to obtain a second mixture solution containing a first quantum dot that has the core and an inner shell of the compound M2C2 formed on the first region of the core, said inner shell having a thickness ranging from 1 Å-10 Å;

c) adding dropwise an etchant into the second mixture solution to selectively etch the oxide layer formed on the second region;

d) diluting the etchant in the second mixture solution to terminate etching of the oxide ager;

e) filtering the second mixture solution to obtain the first quantum dot that has the core and the inner shell formed on the core;

f) adding the first quantum dot obtained in step e) into a dispersant-containing solution to obtain a third mixture solution;

g) settling the third mixture solution;

h) after step g), filtering the third mixture solution to remove residue of the etchant from the first quantum dot so as to obtain a fourth mixture solution containing the first quantum dot; and i) mixing the fourth mixture solution with the solution containing the precursor of M2 and the solution containing the precursor of C2, and growing an outer shell of a single crystal of a compound M2C2 on the second region of the core surface and the inner shell, the outer shell including a first portion and a second portion, the first portion being grown on the inner shell, the second portion being grown on the second region of the core surface and being connected to the first portion, wherein M1 is an element selected from the group consisting of Al, Ga, and In, and C1 is an element selected from the group consisting of P, As, and combinations thereof, and M2 is an element selected from the group consisting of Zn, Pb, Ag, Cu, Mn, Cd, and Mg, and C2 is an element selected from the group consisting of S, Se, O, F, Cl, Br, I, Te, and combinations thereof.

* * * * *